United States Patent
Usui

(10) Patent No.: US 10,409,761 B2
(45) Date of Patent: Sep. 10, 2019

(54) PARALLEL COMPUTER SYSTEM, ARITHMETIC METHOD, AND STORAGE MEDIUM

(71) Applicant: FUJITSU LIMITED, Kawasaki-shi, Kanagawa (JP)

(72) Inventor: Tetsuzou Usui, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 58 days.

(21) Appl. No.: 15/096,689

(22) Filed: Apr. 12, 2016

(65) Prior Publication Data

US 2016/0314093 A1    Oct. 27, 2016

(30) Foreign Application Priority Data

Apr. 24, 2015   (JP) ................. 2015-089245

(51) Int. Cl.
  *G06F 15/16* (2006.01)
  *G06F 17/14* (2006.01)

(52) U.S. Cl.
  CPC .......... *G06F 15/161* (2013.01); *G06F 17/142* (2013.01)

(58) Field of Classification Search
  CPC .................................................. G06F 17/142
  USPC ....................................................... 708/404
  See application file for complete search history.

(56) References Cited

U.S. PATENT DOCUMENTS 4,314,349 A * 2/1982 Batcher .................. G01C 5/005
                                                            708/230

7,937,567 B1 * 5/2011 Nickolls ............. G06F 9/30072
                                                            712/22
2004/0236810 A1   11/2004 Yamamoto et al.

FOREIGN PATENT DOCUMENTS

JP    2000-200261    7/2000
JP    2004-348493    12/2004

OTHER PUBLICATIONS

Dmitry Pekurovsky, P3DFFT: A Framework for Parallel Computations of Fourier Transforms in Three Dimensions, SIAM J. Sci. Comput., vol. 34, No. 4, pp. C192-C209, Aug. 15, 2012.*
Nidhi U, et al., High Performance 3D-FFT Implementation, IEEE 2013 pp. 2227-2230.*

(Continued)

*Primary Examiner* — Andrew Caldwell
*Assistant Examiner* — Emily E Larocque
(74) *Attorney, Agent, or Firm* — Staas & Halsey LLP

(57) ABSTRACT

A parallel computer system includes a plurality of processing apparatuses that perform an arithmetic operation on elements of an array in parallel, wherein each of the plurality of processing apparatuses performs an arithmetic operation in a first axial direction on a first predetermined number of elements among elements disposed in the processing apparatus by different processing apparatuses, and stores the first predetermined number of elements having been subjected to the arithmetic operation in a storage device of the processing apparatus, and wherein at least some of the plurality of processing apparatuses acquire elements other than the first predetermined number of elements from each of the plurality of processing apparatuses, perform an arithmetic operation in the first axial direction on the acquired elements, and dispose a second predetermined number of elements having been subjected to the arithmetic operation in each of the plurality of processing apparatuses.

12 Claims, 31 Drawing Sheets

(56) References Cited

OTHER PUBLICATIONS

Sukhyun Song, et al., Desining an Auto-Tuning Parallel 3-D FFT for Computation-Communication Overlap, PPoPP, Feb. 15-19, 2014, pp. 181-192.*
Eleftheriou, M. et al., "Scalable framework for 3D FFTs on the Blue Gene/L supercomputer: implementation and early performance measurements", *IBM Journal of Research and Development*, IBM, vol. 49, Mar. 2005, pp. 457-464.
Eleftheriou, M. et al., "Performance measurements of the 3d FFT on the Blue Gene/L supercomputer", *Euro-Par 2005 Parallel Processing*, Springer, 2005, pp. 795-803.
Schulz, R., "3D FFT with 2D decomposition", *CS project report*, Apr. 2008, pp. 1-19.
Li, N. et al., "2DECOMP&FFT—A Highly Scalable 2D Decomposition Library and FFT Interface", *Cray User Group 2010 conference*, 2010, pp. 1-13.
Takahashi, D., "FFTE: A Fast Fourier Transform Package", <http://www.ffte.jp>, accessed on Mar. 2, 2016 (3 pages).
Duy, T.V.T. et al., "A decomposition method with minimum communication amount for parallelization of multidimensional FFTs", *CoRR abs/1302.6189*, Feb. 2013, pp. 1-24.

\* cited by examiner

FIG. 2

| PROCESS NUMBER | ARRAY SIZE OF Z-DIRECTION DIVISION | ARRAY SIZE OF X-DIRECTION DIVISION |
|---|---|---|
| 0 | 10×9×2=180 | 3×9×8=216 |
| 1 | 10×9×2=180 | 3×9×8=216 |
| 2 | 10×9×2=180 | 3×9×8=216 |
| 3 | 10×9×2=180 | 1×9×8=72 |
| TOTAL NUMBER OF ELEMENTS | 720 | 720 |

FIG. 6

| PROCESS NUMBER | ARRAY SIZE OF X-DIRECTION COLUMN | ARRAY SIZE OF Y-DIRECTION COLUMN | ARRAY SIZE OF Z-DIRECTION COLUMN |
|---|---|---|---|
| 0 | 10×3×2=60 | 4×9×2=72 | 4×3×8=96 |
| 1 | 10×3×2=60 | 4×9×2=72 | 4×3×8=96 |
| 2 | 10×3×2=60 | 4×9×2=72 | 4×3×8=96 |
| 3 | 10×3×2=60 | 4×9×2=72 | 4×0×8=0 |
| 4 | 10×3×2=60 | 4×9×2=72 | 4×3×8=96 |
| 5 | 10×3×2=60 | 4×9×2=72 | 4×3×8=96 |
| 6 | 10×3×2=60 | 4×9×2=72 | 4×3×8=96 |
| 7 | 10×3×2=60 | 4×9×2=72 | 4×0×8=0 |
| 8 | 10×3×2=60 | 2×9×2=36 | 2×3×8=48 |
| 9 | 10×3×2=60 | 2×9×2=36 | 2×3×8=48 |
| 10 | 10×3×2=60 | 2×9×2=36 | 2×3×8=48 |
| 11 | 10×3×2=60 | 2×9×2=36 | 2×0×8=0 |
| TOTAL NUMBER OF ELEMENTS | 720 | 720 | 720 |

*PROCESSES 0 TO 8 TAKE CHARGE OF
ELEMENTS OF 7×10=70
PROCESS 9 TAKES CHARGE OF
ELEMENTS OF 1×10=10

FIG. 14

| PROCESS NUMBER | ARRAY SIZE AFTER FFT IN Y-DIRECTION | | ARRAY SIZE AFTER FFT IN Z-DIRECTION | |
|---|---|---|---|---|
| | RETURN COMMUNICATION ABSENT | RETURN COMMUNICATION PRESENT | RETURN COMMUNICATION ABSENT | RETURN COMMUNICATION PRESENT |
| 0 | 3×9×2=54 | 1×3×2=6 | 7×1×8=56 | 2×1×2=4 |
| 1 | 3×9×2=54 | 1×3×2=6 | 7×1×8=56 | 2×1×2=4 |
| 2 | 3×9×2=54 | 1×3×2=6 | 7×1×8=56 | 2×1×2=4 |
| 3 | 3×9×2=54 | 1×3×2=6 | 7×1×8=56 | 2×1×2=4 |
| 4 | 3×9×2=54 | 1×3×2=6 | 7×1×8=56 | 2×1×2=4 |
| 5 | 3×9×2=54 | 1×3×2=6 | 7×1×8=56 | 2×1×2=4 |
| 6 | 3×9×2=54 | 1×3×2=6 | 7×1×8=56 | 2×1×2=4 |
| 7 | 3×9×2=54 | 1×3×2=6 | 7×1×8=56 | 2×1×2=4 |
| 8 | 3×9×2=54 | 1×3×2=6 | 7×1×8=56 | 2×1×2=4 |
| 9 | 3×9×2=54 | 1×3×2=6 | 7×1×8=56 | 2×1×2=4 |
| 10 | 3×9×2=54 | 1×3×2=6 | 7×1×8=56 | 2×1×2=4 |
| 11 | 3×9×2=54 | 1×3×2=6 | 7×1×8=56 | 2×1×2=4 |
| NUMBER OF ELEMENTS | 648 | 72 | 672 | 48 |
| TOTAL | 720 | | 720 | |

FIG. 32

| DIVISION METHOD | AXIS | COMMUNICATION FOR RETURNING ARRANGEMENT OF DATA | AMOUNT OF ALL-TO-ALL COMMUNICATION | RESTRICTION | LENGTH OF MESSAGE WHEN TOTAL NUMBER OF PROCESSES = NP |
|---|---|---|---|---|---|
| SIMPLE DIVISION OF GLOBAL ARRAY | ONE-AXIS DISPERSION | PRESENT | TWICE | MIDDLE | $(N^3)/(NP^2)$ |
| | | ABSENT | ONCE | MIDDLE | $(N^3)/(NP^2)$ |
| | TWO-AXIS DISPERSION | PRESENT | FOUR TIMES | STRONG | $(N^3)/NP/NP^{(1/2)}$ |
| | | ABSENT | TWICE | STRONG | $(N^3)/NP/NP^{(1/2)}$ |
| DIVISION OF FFT MULTIPLICITY BETWEEN PROCESSES | ONE-AXIS DISPERSION | PRESENT | TWICE | MIDDLE | $(N^3)/(NP^2)$ |
| | | ALMOST ABSENT | ONCE+$\alpha$ | WEAK | $(N^3)/(NP^2)/NS$ |
| | TWO-AXIS DISPERSION | PRESENT | FOUR TIMES | MIDDLE | $(N^3)/NP/NP^{(1/2)}$ |
| | | ALMOST ABSENT | TWICE+$\alpha$ | WEAK | $(N^3)/NP/NP^{(1/2)}/NS$ |
| | THREE-AXIS DISPERSION | PRESENT | SIX TIMES | MIDDLE | $(N^3)/NP/NP^{(1/3)}$ |
| | | ALMOST ABSENT | FOUR TIMES+$\alpha$ | WEAK | $(N^3)/NP/NP^{(1/3)}/NS$ |

PARALLEL COMPUTER SYSTEM, ARITHMETIC METHOD, AND STORAGE MEDIUM

CROSS-REFERENCE TO RELATED APPLICATION

This application is based upon and claims the benefit of priority of the prior Japanese Patent Application No. 2015-089245, filed on Apr. 24, 2015, the entire contents of which are incorporated herein by reference.

FIELD

The embodiment discussed herein is related to parallel distributed processing.

BACKGROUND

Fast Fourier transform (hereinafter, referred to as FFT) is a technique for performing discrete Fourier transform at a high speed, and three-dimensional FFT is an important calculation technique which is used to analyze various physical problems. As the performance of a parallel computer system such as a super computer becomes higher, a technique for performing three-dimensional FFT at a high speed has attracted attention.

In recent parallel computer systems, a large number of central processing units (CPUs) are operated in parallel in order to improve the performance of the parallel computer system, and a process on each CPU advances processing while exchanging numerical data with other processes to thereby complete the overall processing. In a case where the parallel computer system is made to perform three-dimensional FFT, a three-dimensional array (for example, data designated by a user, and referred to as a global array) to be calculated is divided, and local arrays created by the division are allocated to processes. As a typical division method, one-axis distribution (also referred to as slab-decomposition), two-axis distribution (also referred to as column wise-decomposition), and three-axis distribution (also referred to as volumetric decomposition) are known.

The division of a global array has restrictions. For example, it is preferable that the number of elements to be factored in each axial direction may be a relatively small prime factor such as approximately 2, 3, 5, or 7, in terms of algorithm of discrete Fourier transform. In addition, it is preferable that the number of elements in each axial direction is divided by the number of processes. Consequently, in the related art, for example, the number of elements and the number of processes in each axial direction are set to a power of 2. However, there is a case where the number of elements or the number of processes has to be set to a number which is not a power of 2. In addition, in a case where a data type is not a complex number type but a real number type, the number of first dimensional elements is not set to a power of 2. Accordingly, it is not preferable that the number of elements and the number of processes are limited to only a power of 2.

In addition, the number of discrete points to be used in scientific and technological calculation has been diversified, and a parallel computer system has been complicated. Accordingly, the adoption of the above-mentioned setting may result in a situation where some CPUs are not used.

On the other hand, the relaxation of restrictions on division (that is, allowance of various numbers of elements and processes) often brings about a case where the numbers of elements in respective processes are not equal to each other. Particularly, in the above-mentioned two-axis distribution and three-axis distribution, data communication for returning the arrangement of elements to the original arrangement is performed due to a change in the number of elements included in each process in the middle of calculation. In a case of parallel distributed processing of three-dimensional FFT, a ratio of a time used for data communication between processes to the entire processing time is large, and an increase in the amount of data communication results in the deterioration of performance of the parallel distributed processing. The related art is not focused on such problems. Japanese Laid-open Patent Publication No. 2000-200261 and Japanese Laid-open Patent Publication No. 2004-348493 are examples of related art.

In addition, examples of related art include (1) M. Eleftheriou, B. G. Fitch, A. Rayshubskiy, T. J. C. Ward, R. S. Germain, "Scalable framework for 3D FFTs on the Blue Gene/L supercomputer: implementation and early performance measurements", IBM Journal of Research and Development, IBM, 2005, 49, 457-464, (2) M. Eleftheriou, B. G. Fitch, A. Rayshubskiy, T. J. C. Ward, R. S. Germain, "Performance measurements of the 3$d$ FFT on the Blue Gene/L supercomputer", Euro-Par 2005 Parallel Processing, Springer, 2005, 795-803, (3) Roland Schulz, "3D FFT with 2D decomposition", CS project report, 2008, [searched on Mar. 30, 2015], the Internet, (4) Ning Li, Sylvain Laizet, "2DECOMP &FFT-A Highly Scalable 2DDecomposition Library and FFT Interface", Cray User Group 2010 conference, 2010, 1-13, [searched on Mar. 30, 2015], the Internet, (5) Daisuke Takahashi, "FFTE: A Fast Fourier Transform Package", [searched on Mar. 30, 2015], the Internet, (6) T. V. T. Duy, T. Ozaki, "A decomposition method with minimum communication amount for parallelization of multi-dimensional FFTs", CoRR abs/1302.6189, 2013, [searched on Mar. 30, 2015], the Internet, and (7) "OpenFFT An open Source Parallel Package for 3-D FFTs", [searched on the Internet at URL=http://www.openmx-square.org/openfft/]

In one aspect, an embodiment aims to provide a technique for achieving both the relaxation of restrictions on the division of a three-dimensional array and an improvement in performance, in a case where a parallel computer system performs three-dimensional FFT on the three-dimensional array.

SUMMARY

According to an aspect of the invention, a parallel computer system includes a plurality of processing apparatuses that perform an arithmetic operation on elements of an array in parallel, wherein each of the plurality of processing apparatuses performs an arithmetic operation in a first axial direction on a first predetermined number of elements among elements disposed in the processing apparatus by different processing apparatuses, and stores the first predetermined number of elements having been subjected to the arithmetic operation in a storage device of the processing apparatus, and wherein at least some of the plurality of processing apparatuses acquire elements other than the first predetermined number of elements from each of the plurality of processing apparatuses, perform an arithmetic operation in the first axial direction on the acquired elements, and dispose a second predetermined number of elements having been subjected to the arithmetic operation in each of the plurality of processing apparatuses.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating the size of a local array included in each process;

FIG. 6 is a diagram illustrating the size of a local array included in each process;

FIG. 14 is a diagram illustrating an outline of the present embodiment;

FIG. 32 is a diagram illustrating effects of the present embodiment.

DESCRIPTION OF EMBODIMENT

Division of Global Array

First, basic matters related to the division of a global array are described. Hereinafter, N1 denotes the number of elements in an X-direction of a global array to be subjected to three-dimensional FFT, N2 denotes the number of elements in a Y-direction, and N3 denotes the number of elements in a Z-direction. ND1 denotes the number of processes (that is, the number of divisions) in the X-direction, ND2 denotes the number of processes in the Y-direction, and ND3 denotes the number of processes in the Z-direction. NP1 denotes the number of elements in the X-direction of a local array obtained by dividing a global array, NP2 denotes the number of elements in the Y-direction, and NP3 denotes the number of elements in the Z-direction. In addition, $mod(N, P)=0$ represents the relational expression of the remainder being zero when a natural number N is divided by P.

In three-dimensional FFT, FFT in the X-direction, FFT in the Y-direction, and FFT in the Z-direction are performed. Generally, in a case where FFT in each axial direction is performed, data in the axial direction is temporarily disposed in a specific process by communication between processes, and the specific process performs FFT in the axial direction. Hereinafter, data for performing FFT in the X-direction is referred to as X-direction data, data for performing FFT in the Y-direction is referred to as Y-direction data, and data for performing FFT in the Z-direction is referred to as Z-direction data.

Figure 1:
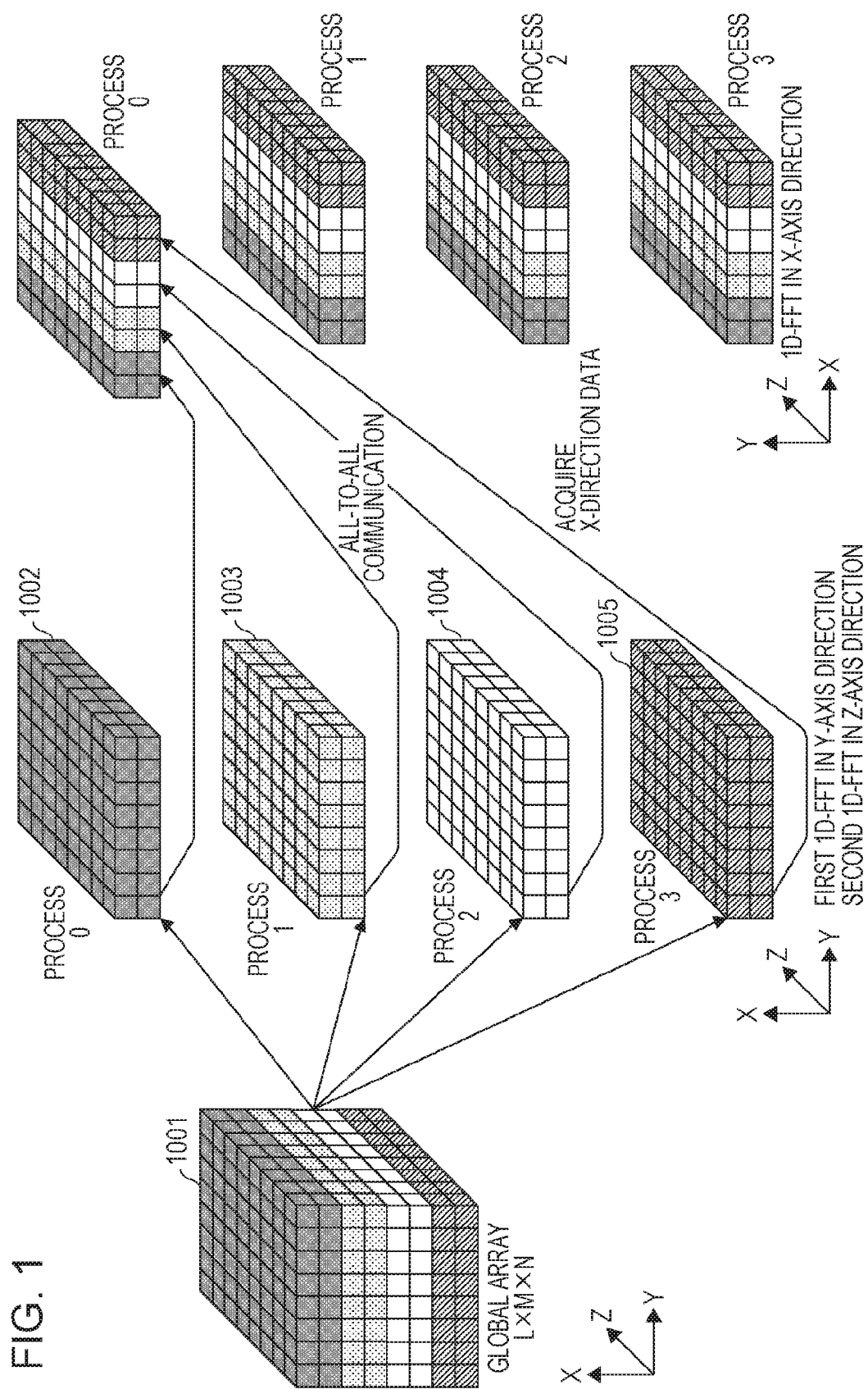
FIG. 1 is a diagram illustrating an example of one-axis distribution.

First, one-axis distribution is described. FIG. 1 illustrates an example of one-axis distribution. In FIG. 1, three-dimensional FFT is performed on a global array 1001. A cube in the global array represents an element. The global array 1001 is divided into slab-wise local arrays 1002 to 1005. A process 0 takes charge of the local array 1002, a process 1 takes charge of the local array 1003, a process 2 takes charge of the local array 1004, and a process 3 takes charge of the local array 1005. Each of the local arrays 1002 to 1005 includes Y-direction data and Z-direction data. Therefore, first one-dimensional FFT is performed on each of the local arrays 1002 to 1005 in the Y-direction, and second one-dimensional FFT is subsequently performed thereon in the Z-direction.

Since the global array 1001 is divided by a surface perpendicular to the X-direction, the X-direction data is dispersed into a plurality of processes. Consequently, all-to-all communication is performed, and each process includes the X-direction data. Then, third one-dimensional FFT is performed in the X-direction.

Thereafter, when all-to-all communication is performed in the direction opposite to the all-to-all communication having been already performed, it is possible to restore data to the original arrangement. When a state where Y-direction data or Z-direction data are distributed among processes is acceptable, it is possible to omit the reverse communication. However, in this case, it is often assumed that the number of elements in the Y-direction or the number of elements in the Z-direction can be divided by the number of processes uniformly.

In one-dimensional division, in a case where the size of a global array is $N^3$, data is not able to be divided into N pieces or more in spite of the number of processes being N or more, and thus an improvement in performance due to an increase in the number of processes may not be expected. In actuality, the size of N is generally equal to or less than several thousands, but several tens of thousands of processes are operated in recent large-scale super computers. Furthermore, it is considered that multi-axis distribution is more preferable than one-axis distribution in consideration of adaptability to a direct network and the influence of a message length on performance.

For example, it is considered that a global array of 10×9×8 is divided by a surface perpendicular to the Z-direction. First, in a case where the number of processes in the Z-direction is greater than 8, the relationship of N3=8 is established, and thus division is not able to be performed. For example, in a case where the number of processes is 4, division may be performed. However, in a case where data which is realigned and divided in the X-direction is output, it is difficult to handle data because N1=10 is not able to be divided by 4. The same is true of the Y-direction. FIG. 2 illustrates the size of a local array included in each process before and after alltoally communication in a message passing interface (MPI). In the example of FIG. 2, the number of processes is 4. The wording "Z-direction division" refers to division by a surface perpendicular to the Z-direction, and the wording "X-direction division" refers to division by a surface perpendicular to the X-direction. In a case of the Z-direction division, the sizes of local arrays included in the respective processes are the same as each other. However, in a case of the X-direction division, the sizes of local arrays included in the respective processes are not the same as each other. Specifically, the size of a local array included in a process 3 is smaller than the sizes of local arrays included in other processes.

Non-uniformity of the size of the local arrays makes it unable to achieve an improvement in performance through parallelization due to a load imbalance, which leads to an undesirable result. In addition, users have to estimate how many elements of each local array are likely to be increased in advance than a case of equal division, and an adequate size of array of a work area (or an array for output) must be prepared. This is not preferable in that a routine of an interface which is general and easy to use is designed. Meanwhile, an input array and an output array are often used in common (that is, an in-place process is adopted) in FFT-related functions. However, in a case where an in-place process is realized, even when the size of a local array becomes non-uniform, communication for returning the arrangement of data to the original arrangement is performed.

Figure 3:
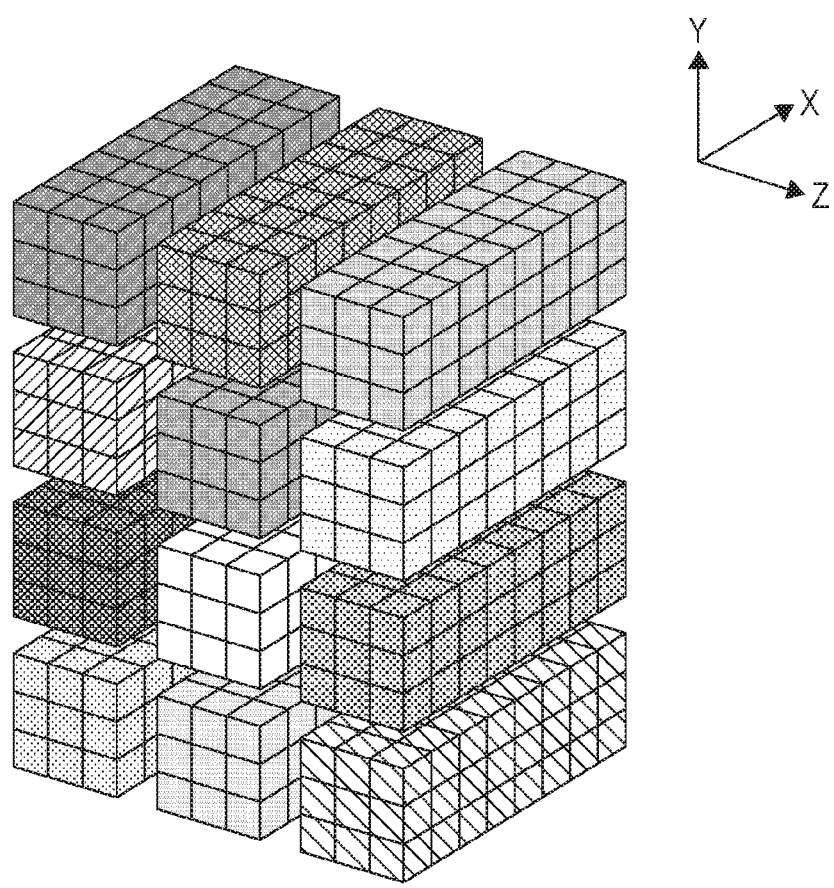
FIG. 3 is a diagram illustrating an example of two-axis distribution.
Figure 4:
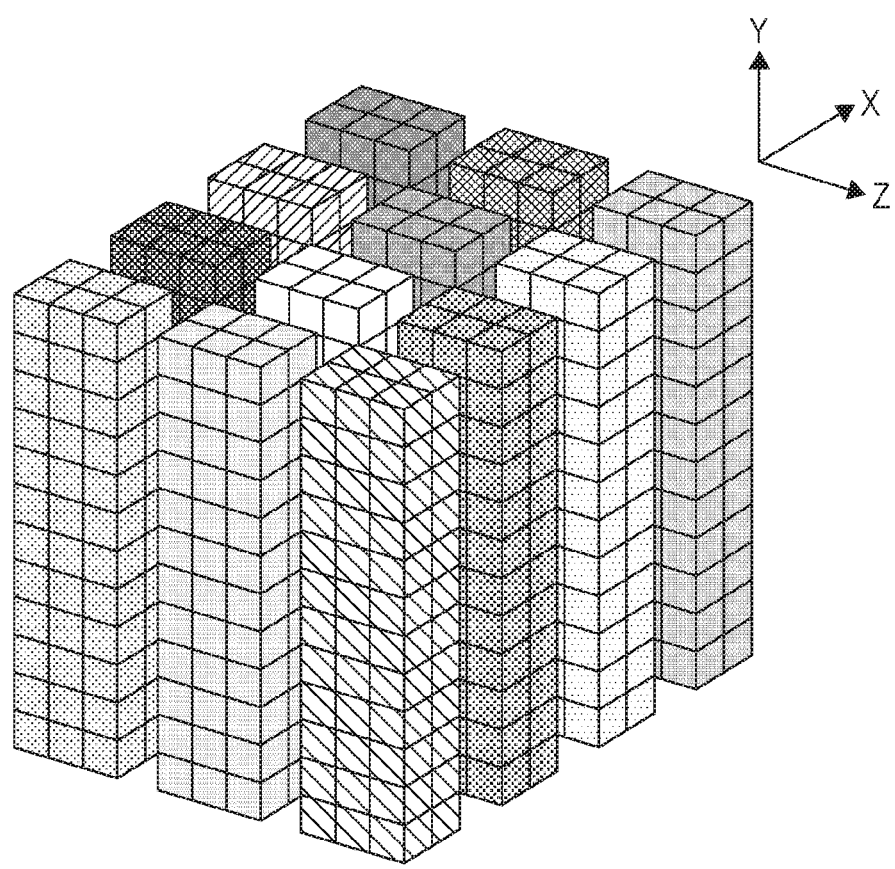
FIG. 4 is a diagram illustrating an example of two-axis distribution.
Figure 5:
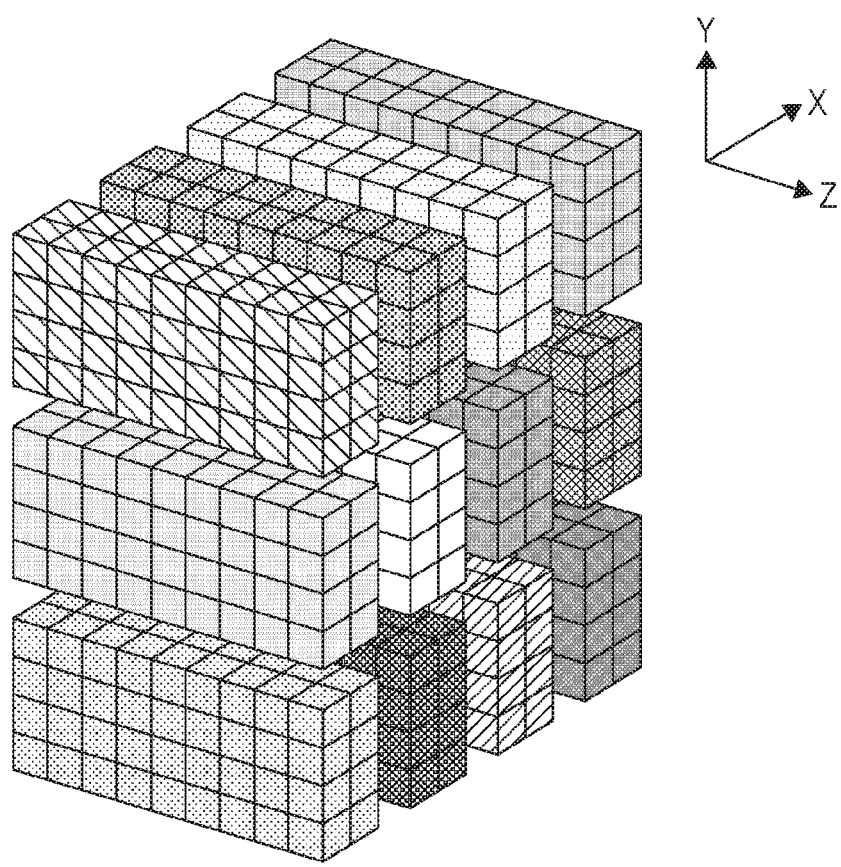
FIG. 5 is a diagram illustrating an example of two-axis distribution.

Second, two-axis distribution is described. In two-axis distribution, for example, as illustrated in FIG. 3, a global array is divided into column-wise local arrays extending in the X-direction. In FIG. 3, elements included in the same process are colored with the same color. First, FFT in the X-direction is performed on each local array. Next, all-to-all communication is performed between processes on an XY plane, and thus the allocation of data is changed as illustrated in FIG. 4. In addition, FFT in the Y-direction is performed on each local array. Next, all-to-all communication is performed between processes on a YZ plane, and thus the allocation of data is changed as illustrated in FIG. 5. In addition, FFT in the Z-direction is performed on each local array.

In this case, data which is input is divided in the form of columns in the X-direction, while data which is output is divided in the form of columns in the Z-direction. Therefore, when it is preferable that data which is output is divided in the form of columns in the X-direction, communication for changing the arrangement of data is further performed.

FIG. 6 illustrates the size of a local array included in each process in a case of two-axis distribution. An example of FIG. 6 is different from those of FIGS. 3 to 5, and indicates that a global array of 10×9×8 is divided by a process grid of 3×4. In FIG. 6, the sizes of local arrays of the respective processes are the same with respect to columns in the X-direction, but the sizes of local arrays of the respective processes are not the same with respect to columns in the Y-direction and the Z-direction. In this manner, different sizes of arrays result in a serious technical problem, for example, in a case where an attempt to provide general-purpose software is made. Particularly, in a case where a data type of input data is not a complex number type but a real number type, the number of first dimensional output elements changes from N1 (real number) to N1/2+1 (complex number), and thus there is a strict restriction on the number of divisions. For example, when N1=8192, the number of output elements in a first dimensional direction is 4097 which is a complex number, and thus the number of processes is limited to 17 or 241 which is a prime factor. Due to such situations, it may be assumed that the following restriction is satisfied in two-axis distribution.

mod(N2, ND2)=0, mod(N3, ND3)=0, mod(N1, ND2)=0, mod(N2, ND3)=0

Figure 7:
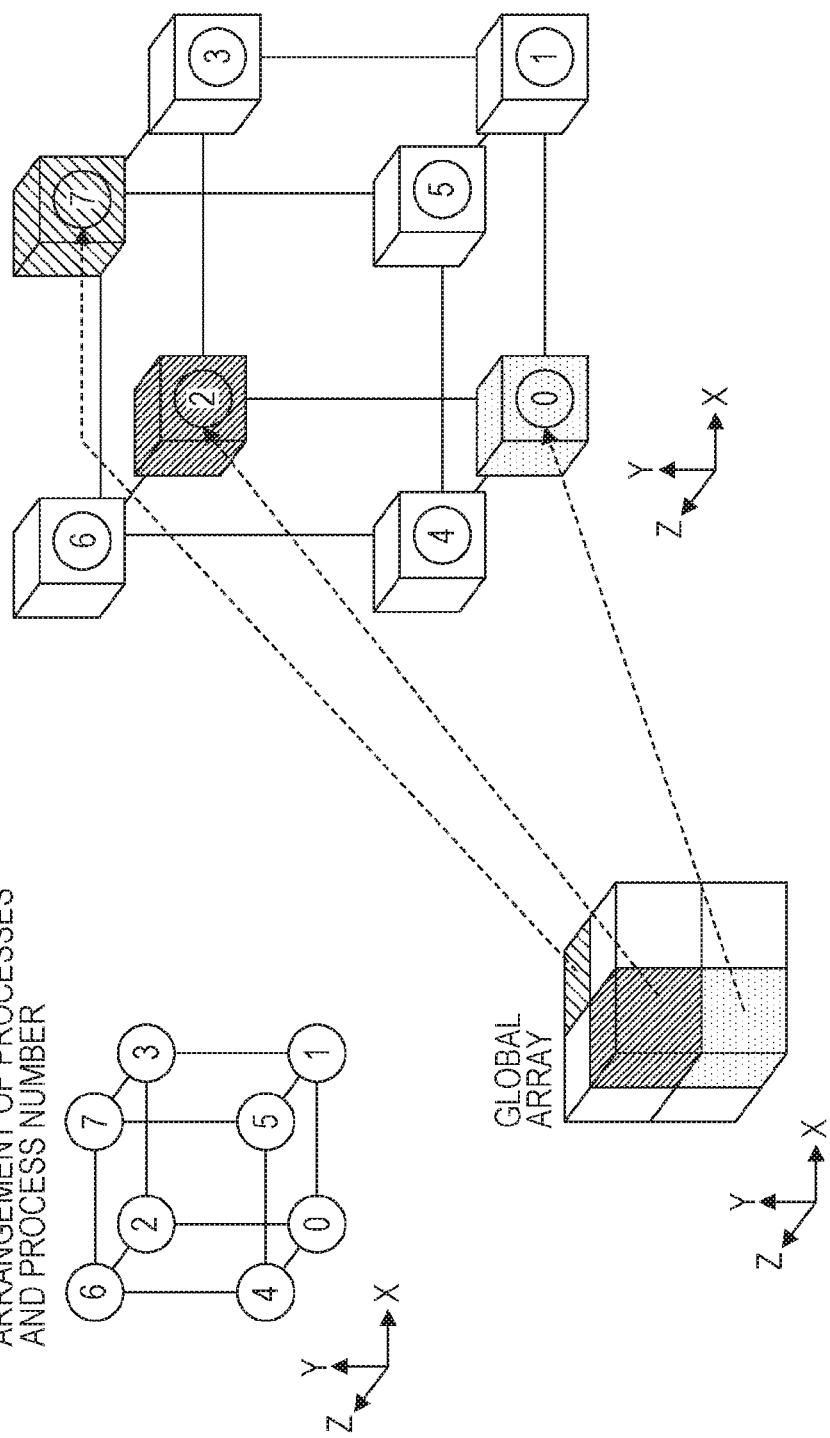
FIG. 7 is a diagram illustrating an example of three-axis distribution.

Third, three-axis distribution is described. FIG. 7 illustrates an example of three-axis distribution. As illustrated in FIG. 7, in three-axis distribution, division is performed in any direction of the X-direction, Y-direction, and Z-direction. A local array having a rectangular parallelepiped shape or a cubic shape is allocated to each of processes 0 to 7.

FFT processes performed in respective axial directions are basically the same as each other, and thus a description is given here using the Z-direction, for example. Considering only a Z-direction process group, FFT in the Z-direction in three-axis distribution is equivalent to FFT in the Z-direction in one-axis distribution. The wording "Z-direction process group" as used herein refers to processes aligned in the Z-direction. In the example of FIG. 7, the process 0 and the process 4 belong to the same Z-direction process group, the process 1 and the process 5 belong to the same Z-direction process group, the process 2 and the process 6 belong to the same Z-direction process group, and the process 3 and the process 7 belong to the same Z-direction process group.

However, in a case where the number of elements N2P in the Y-direction in a certain Z-direction process group is not able to be divided by ND3, the size of a local array becomes non-uniform as illustrated in FIG. 2. Consequently, for example, it is possible to adopt a method in which an FFT multiplicity (=N1P×N2P=(N1/ND1)×(N2/ND2)) in the Z-direction is distributed to processes belonging to the Z-direction process group. In this case also, there is the possibility of the size of a local array becoming non-uniform, and thus the following three conditions are imposed in addition to a condition of mod(Ni, NDi)=0, i=1, 2, 3.

mod(N1P×N2P, ND3)=0, mod(N2P×N3P, ND1)=0, mod(N3P×N1P, ND2)=0

Figure 8:
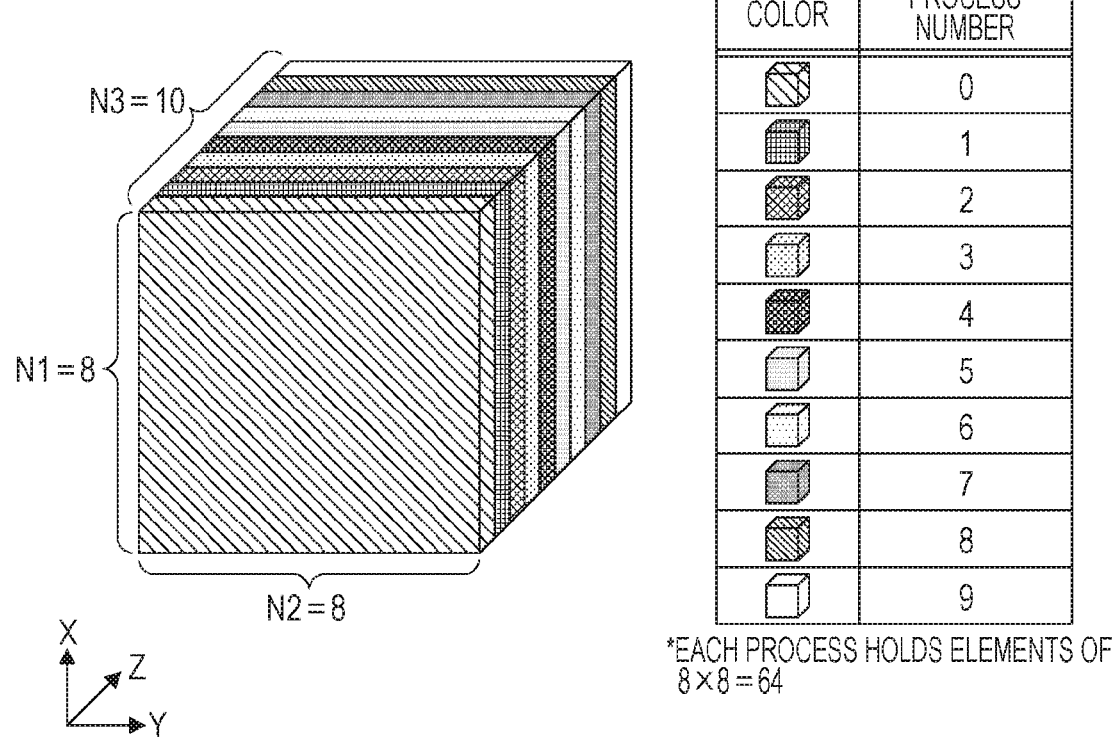
FIG. 8 is a diagram illustrating an example of the allocation of an array.
Figure 9:
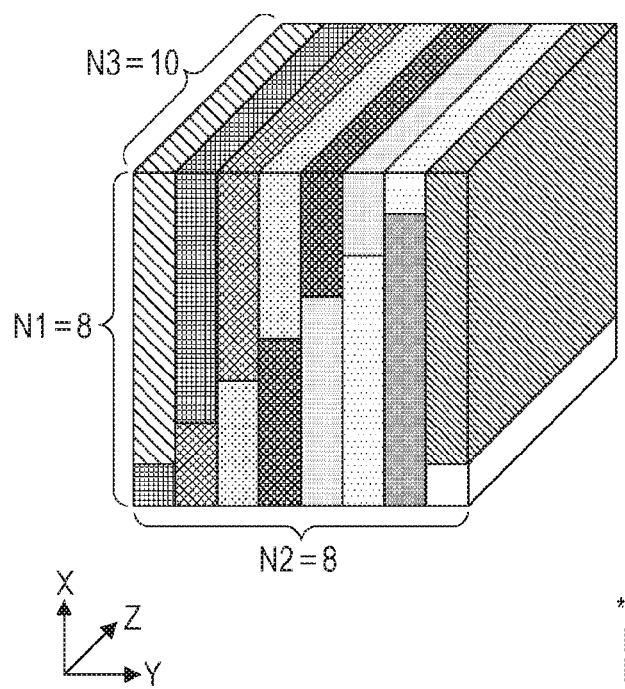
FIG. 9 is a diagram illustrating an example of the allocation of an array.

In a case where such conditions are not satisfied, the size of a local array becomes non-uniform. For example, it is considered that processes 0 to 9 perform FFT in the Z-direction on a global array illustrated in FIG. 8. It is assumed that the size of the global array is 8×8×10. When all-to-all communication is performed to rearrange data in order to perform FFT in the Z-direction, a result as illustrated in, for example, FIG. 9 is obtained. In FIG. 9, each process includes Z-direction data, but an FFT multiplicity in the Z-direction of 8×8=64 is not able to be divided by 10, and thus the number of elements included in the process 9 is smaller than the numbers of elements included in other processes. Specifically, the number of elements included in each of the processes 0 to 8 is 70, and the number of elements included in the process 9 is 10. In order to return such arrangement to the original arrangement, all-to-all communication is performed again. Accordingly, in a case where elements are not able to be equally distributed in any of the X-direction, the Y-direction, and the Z-direction, a total of six all-to-all communication processes are performed. Therefore, the amount of communication tends to be increased in a case of three-axis distribution, as compared to cases of one-axis distribution and two-axis distribution.

Meanwhile, it is also possible to perform one-axis distribution and two-axis distribution which are different from the above-described method by regarding the number of divisions in the X-direction or Y-direction as 1 in three-axis distribution. These methods are special cases of three-axis distribution, and thus restrictions on division and features of a communication amount are basically the same as contents described in the three-axis distribution. Compared with the above-described one-axis distribution and two-axis distribution, the degree of non-uniformity of the number of elements may be reduced, while it is difficult to omit communication for returning arrangement to the original arrangement.

Figure 10:
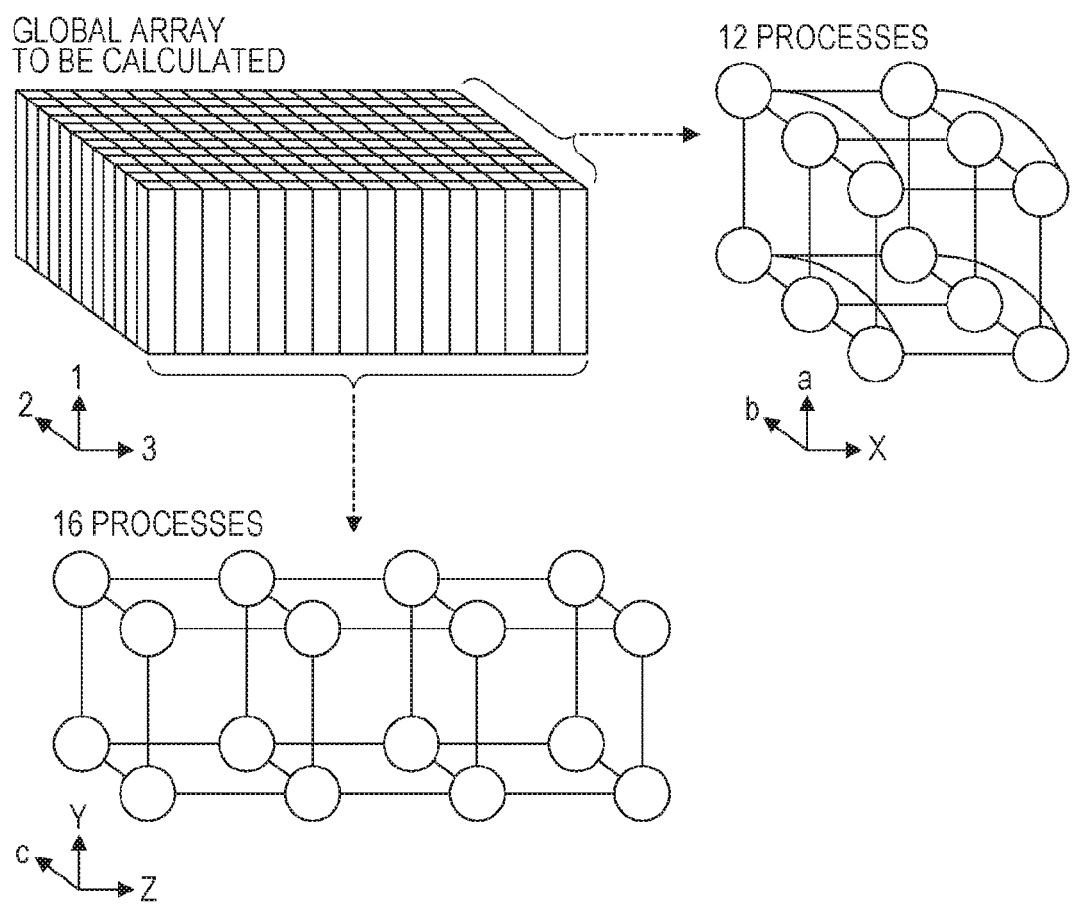
FIG. 10 is a diagram illustrating a relationship between a direct network and a global array.

Meanwhile, data may be dispersed in accordance with the shape of a network, and thus a multi-axis distribution is advantageous, particularly, in a case of a direct network. For example, FIG. 10 illustrates a relationship between a network (hereinafter, topology of this network is referred to as "six-dimensional mesh/torus") of a super computer "K" and a global array. In FIG. 10, a six-dimensional shape is represented by XYZabc. For example, in a case where a two-dimensional shape of 12×16 is designated, Xab=2×2×3 may be allocated in a one-dimensional manner, and YZc=2×4×2 may be allocated in a two-dimensional manner.

Figure 11:
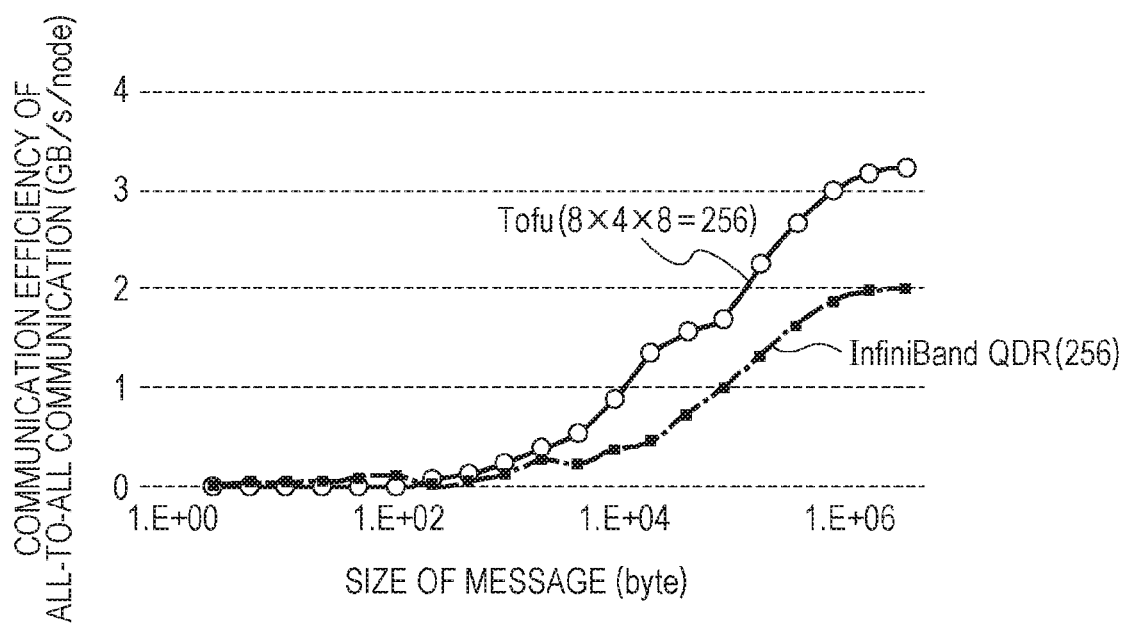
FIG. 11 is a diagram illustrating a relationship between a communication amount of all-to-all communication and the size of a message.

However, multi-axis distribution is not necessarily effective in a case of an indirect network. As described above, in a case of one-axis distribution, it is not possible to use the number of processes which is equal to or greater than the number of elements of one side. In addition, as illustrated in FIG. 11, in one-axis distribution, the length of a message in all-to-all communication is reduced, and thus communication efficiency is deteriorated. In FIG. 11, the vertical axis represents communication efficiency of all-to-all communication (the amount of communication per unit time of each node), and the horizontal axis represents the size of a message. In this example, both the amount of communication of a torus fusion (Tofu) interconnect of 8×4×8 and the amount of communication of a quad data rate (QDR) of an infiniband of 8×4×8 are reduced as the size of the message decreases, and are increased as the size of the message increases. That is, communication efficiency is deteriorated as the length of a message decreases.

Accordingly, even when the amount of communication between processes is increased by adopting multi-axis distribution, multi-axis distribution may be an effective method, even in a case of an indirect network when communication efficiency may be improved to such a degree as to exceed the amount of communication.

Outline of the Present Embodiment

Regarding the above-mentioned one-axis distribution and two-axis distribution, it is difficult to suppress the non-uniformity of the size of a local array, and thus three-axis distribution is adopted in the present embodiment. In a case of three-axis distribution, a process for returning the arrangement of data to the original arrangement after performing FFT is generally performed, and thus it is possible to dispersedly perform FFT and communication in each direction in accordance with the size of a work array. Thereby, a work array may not be prepared in consideration of the possibility of the number of elements being increased, and thus an interface is simplified. In addition, in the present embodiment, the amount of communication is reduced by performing a process for returning the arrangement of data to the original arrangement after performing FFT only on some elements, thereby improving the performance of a parallel computer system.

An outline of the present embodiment is described with reference to FIGS. 12 to 15. Regarding FFT in the X-direction, the same process as in the related art is performed, and thus a description thereof is omitted, and an example in which a global array of 10×9×8 is biaxially divided by 3×4 process grids in the Y-direction and the Z-direction is described. Each process includes elements of 10×3×2=60. That is, the relationships of mod(N2, ND2)=0 and mod(N3, ND3)=0 are established.

In a case where arrangement is returned to the original arrangement by applying FFT of forward transformation in the order of the X-direction, the Y-direction, and the Z-direction and then applying FFT of inverse transformation in the order of the Z-direction, the Y-direction, and the X-direction, there is no restriction on the arrangement of elements between the forward transformation in the Z-direction and the inverse transformation in the Z-direction. Consequently, the processing of a Z-direction process group is described first.

Figure 12:
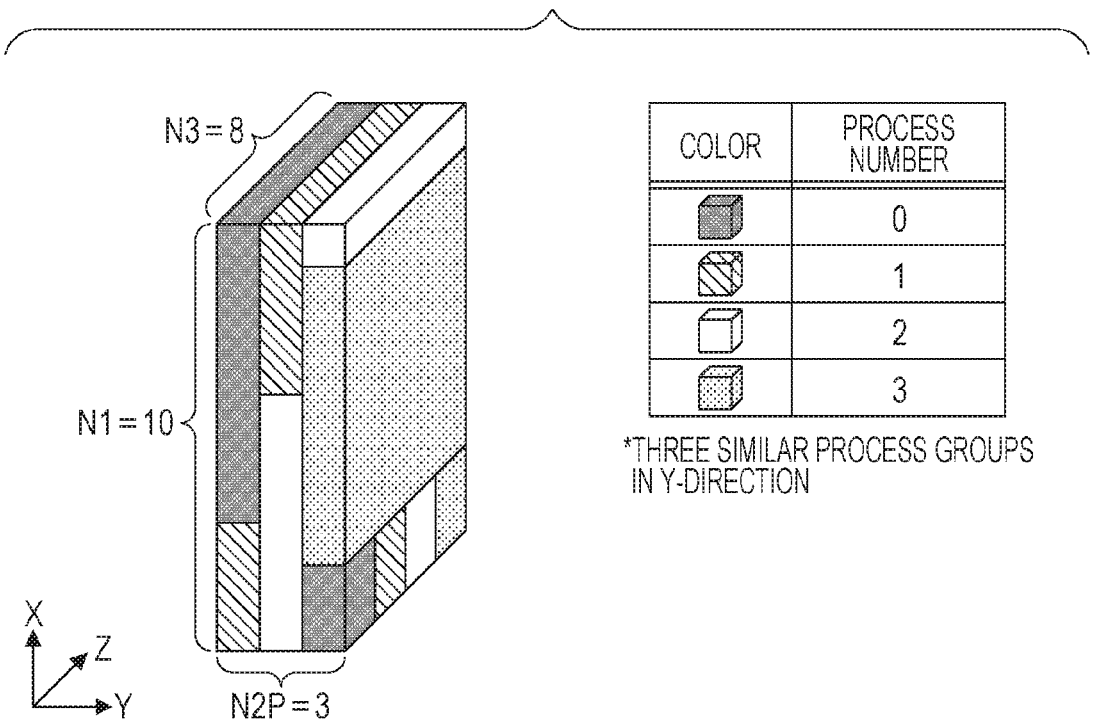
FIG. 12 is a diagram illustrating an outline of the present embodiment.

Regarding the Z-direction, an array, being a rectangular parallelepiped shape, which is processed by one Z-direction process group, is regarded as having a size of 10×3×8, and an array processed by each process may be regarded as having a size of 10×3×2. The array of 10×3×8 is equivalent to one third of a global array. An FFT multiplicity of a Z-direction process group is 10×3=30, and 30 is not able to be divided by 4. In the related art, elements are allocated to each process with the relation of 30=8+8+8+6, and thus the number of elements is non-uniform. However, in the present embodiment, elements (large blocks) are first allocated to each process with the relation of 28=7+7+7+7, and then FFT in the Z-direction is performed on the process. Each process stores elements having been subjected to FFT in an output array which is managed by the process. Next, the remaining two elements (small blocks) are allocated to at least some processes (for example, two processes) in the Z-direction process group, and the processes are made to perform FFT in the Z-direction. In addition, communication for returning the arrangement of the two elements to the original arrangement is performed. As a result, a local array taken charge of by processes 0 to 3 in the Z-direction process group is as illustrated in FIG. 12. With such arrangement, the numbers of elements included in the respective processes 0 to 3 are the same as each other.

Regarding the Y-direction, an array, being a rectangular parallelepiped shape, which is processed by one Y-direction process group, is regarded as having a size of 10×9×2, and an array processed by each process may be regarded as having a size of 10×3×2. The array of 10×9×2 is equivalent to one fourth of a global array. An FFT multiplicity in the Y-direction is 10×2=20, and 20 is not able to be divided by 3. In the related art, elements are allocated to each process with the relation of 20=7+7+6, and thus the number of elements is non-uniform. However, in the present embodiment, elements (large blocks) are first allocated to each process with the relation of 18=6+6+6, and then FFT in the Y-direction is performed on the process. Each process stores elements having been subjected to FFT in an output array which is managed by the process. Next, the remaining two elements (small blocks) are allocated to at least some processes (for example, two processes) in the Y-direction process group, and the processes are made to perform FFT in the Y-direction. In addition, communication for returning the arrangement of the two elements to the original arrangement is performed.

Figure 13:
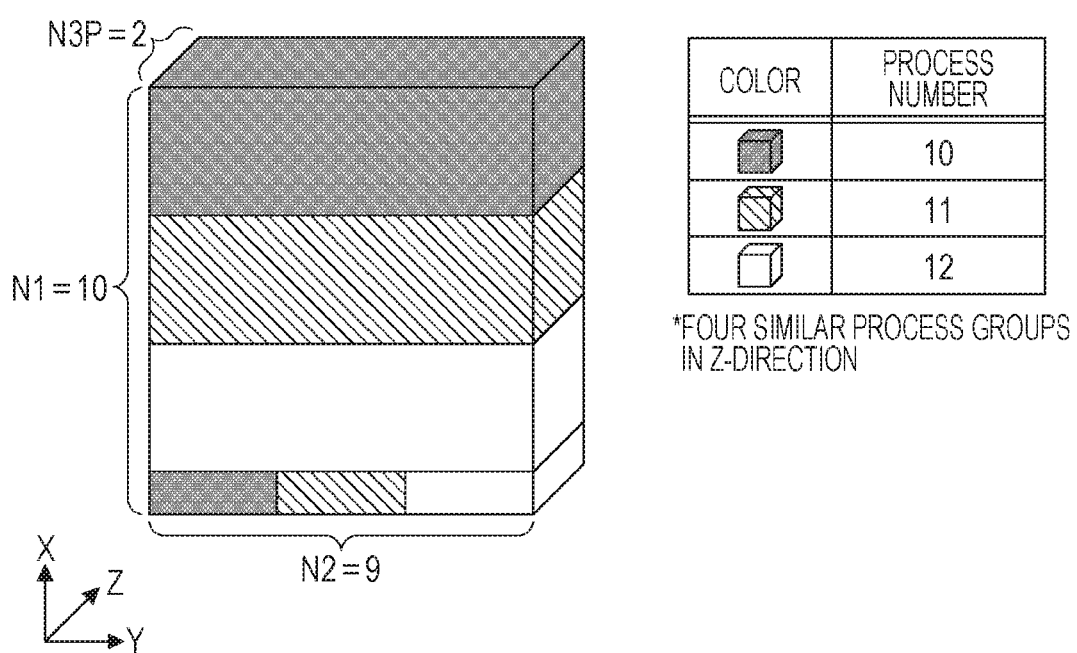
FIG. 13 is a diagram illustrating an outline of the present embodiment.

Meanwhile, as a result of the FFT in the Y-direction, elements have to be disposed in each process so as to satisfy a condition that the arrangement of elements in the Z-direction is not broken. According to this condition, elements adjacent to each other in the Z-direction in the original array of 10×3×2 are also adjacent to each other in the Z-direction when the result of the FFT in the Y-direction is stored. As a result, a local array taken charge of by processes 10 to 12 in the Y-direction process group is as illustrated in FIG. 13. With such arrangement, the numbers of elements included in the respective processes 10 to 12 are the same as each other.

FIG. 14 illustrates the size of an array after FFT in the Y-direction and the size of an array after FFT in the Z-direction. As illustrated in FIG. 14, when return communication is performed on some elements after FFT in the Y-direction, the numbers of elements included in respective processes become the same. Similarly, when return communication is performed on some elements after FFT in the Z-direction, the numbers of elements included in respective processes become the same.

Figure 15:
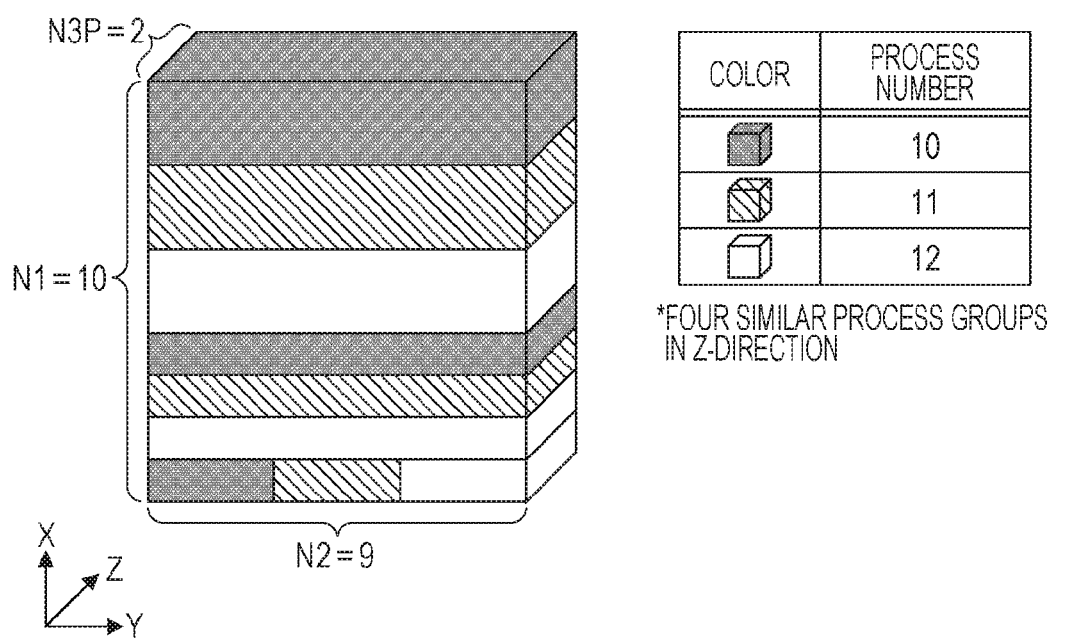
FIG. 15 is a diagram illustrating an outline of the present embodiment.

Meanwhile, in a case where a work area for communication is small, it is also possible to divide processing with respect to a large block. FIG. 15 illustrates the arrangement of elements in a case where the processing of a large block is further divided. In this example, elements are allocated to each process with the relation of 18=(4+2)+(4+2)+(4+2). In general, division is not performed so as to avoid the deterioration of communication efficiency due to a reduction in the length of a message. However, since communication efficiency is stabilized in a case of a sufficient length of a message, division does not exert adverse influences on performance. Performance may be rather improved by the blocking of processing in a case of a CPU having a hierarchical memory structure. In addition, communication and an arithmetic operation, which are difficult in a batch communication method, may overlap each other.

Specific Contents of the Present Embodiment

Figure 16:
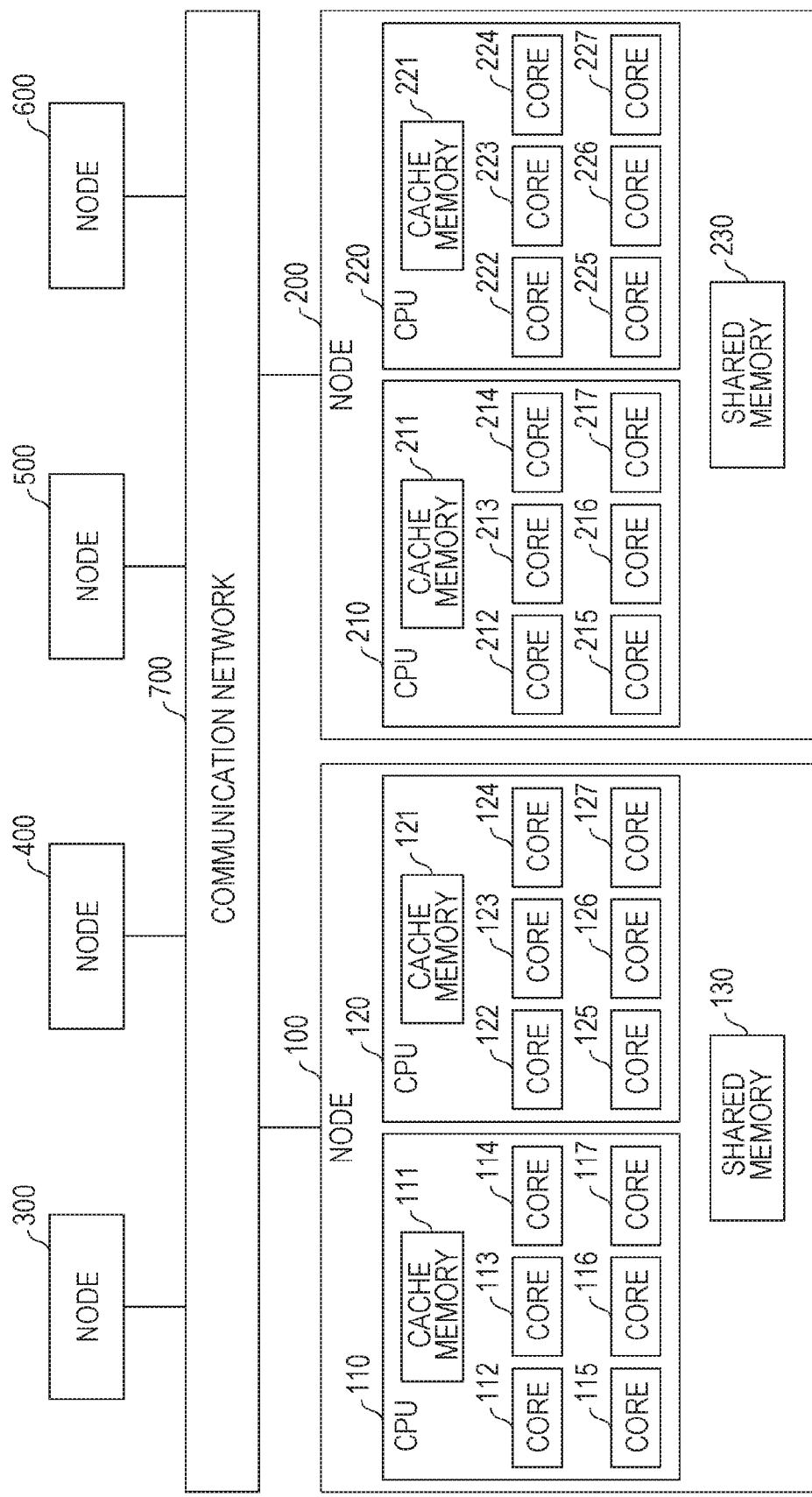
FIG. 16 is a diagram illustrating an example of a parallel computer system in the present embodiment.

FIG. 16 illustrates an example of a parallel computer system in the present embodiment. Nodes 100 to 600 are connected to each other through, for example, a communication network 700 which is a direct network. The communication network 700 has a shape of, for example, a six-dimensional mesh/torus, but is not limited thereto. In addition, in FIG. 16, the number of nodes is six, but is not limited thereto.

A configuration of a communication network is roughly classified into a direct network and an indirect network. A network to which nodes are connected in the form of a multi-dimensional grid is called a direct network. For example, a Tofu network of a super computer "K" is a direct network. On the other hand, a network to which a node is connected through a switch mechanism such as a network switch is called an indirect network. For example, a fat tree type network or a crossbar type network is an indirect network.

The node 100 includes a CPU 110, a CPU 120, and a shared memory 130 which is used by the CPU 110 and the CPU 120. The CPU 110 includes a cache memory 111 and cores 112 to 117. The CPU 120 includes a cache memory 121 and cores 122 to 127. In FIG. 16, the number of cores of the CPU 110 and the CPU 120 is six, but is not limited thereto.

A program (for example, a program of an MPI) for realizing a process in the present embodiment is stored in a storage device which is separately provided, and is, in actuality, loaded into the shared memory 130, a main memory which is separately provided, or the like. The CPU 110 and the CPU 120 realizes one or a plurality of processes by executing a program.

A configuration of the node 200 is the same as the configuration of the node 100, and thus a description thereof is omitted here. In addition, configurations of the nodes 300 to 600 are the same as the configurations of the node 100 and the node 200.

Figure 17:
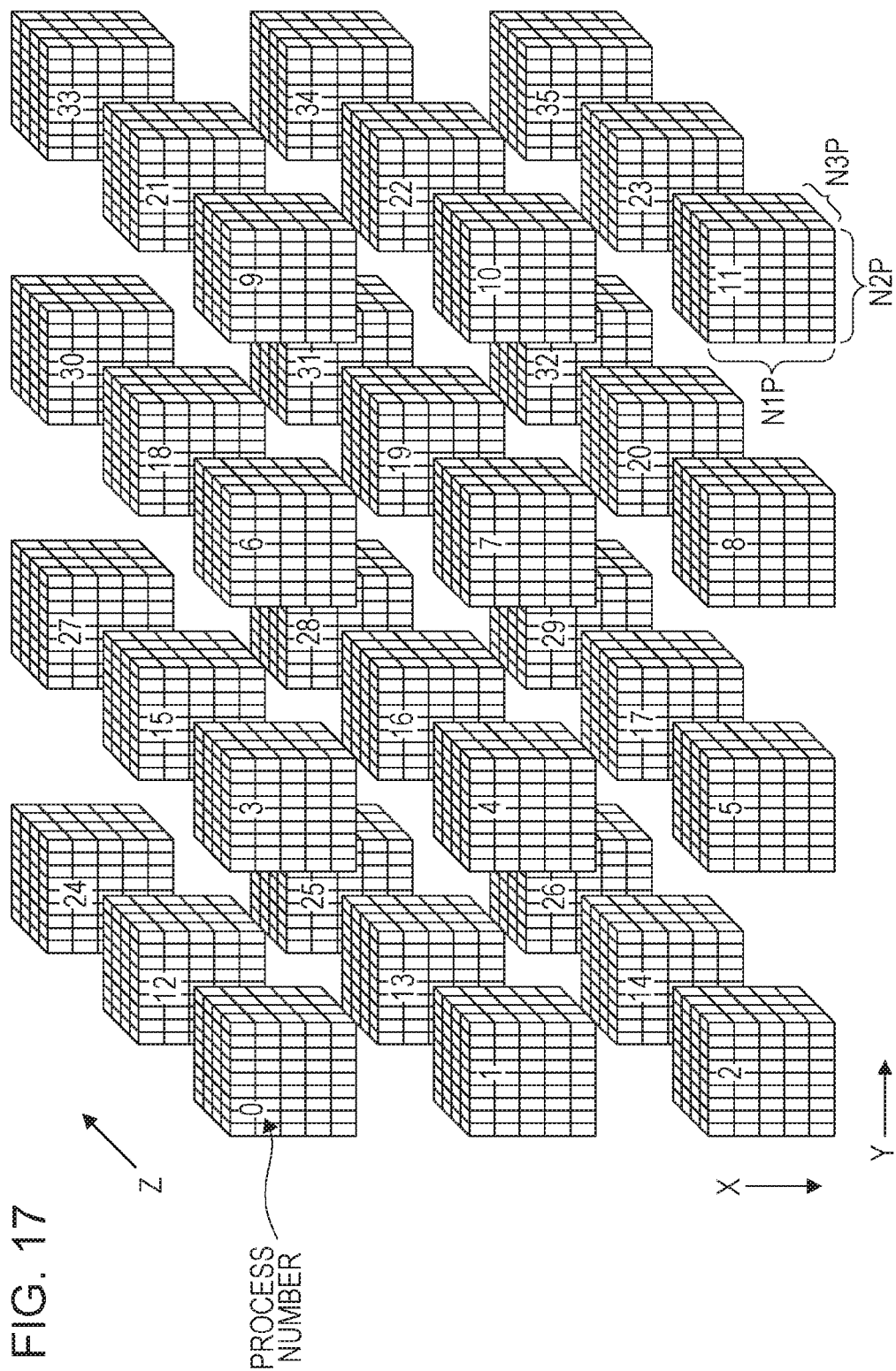
FIG. 17 is a diagram illustrating the number of processes in each axial direction.

Next, an operation of the parallel computer system in the present embodiment is described with reference to FIGS. 17 to 32. Here, as illustrated in FIG. 17, arrays are allocated to 36 processes with the relations of ND1=3, ND2=4, and ND3=3. In addition, the relations of N1P=N1/ND1, N2P=N2/ND2, and N3P=N3/ND3 are established.

First, FFT of forward transformation is described.

Each of processes operated in the parallel computer system receives an input of data (that is, elements of a local array) to be processed by the process (FIG. 18: step S1), and stores the received data in a storage area (here, a portion of an area in a shared memory) which is managed by the process. The data is input by, for example, a user.

Each process performs data communication for changing the arrangement of elements between the process and a process belonging to the same X-direction process group (step S3). For example, in the example of FIG. 17, processes 0 to 2 belong to the same X-direction process group, processes 3 to 5 belong to the same X-direction process group, processes 6 to 8 belong to the same X-direction process group, processes 9 to 11 belong to the same X-direction process group, processes 12 to 14 belong to the same X-direction process group, processes 15 to 17 belong to the same X-direction process group, processes 18 to 20 belong to the same X-direction process group, processes 21 to 23 belong to the same X-direction process group, processes 24 to 26 belong to the same X-direction process group, processes 27 to 29 belong to the same X-direction process group, processes 30 to 32 belong to the same X-direction process group, and processes 33 to 35 belong to the same X-direction process group.

Figure 19:
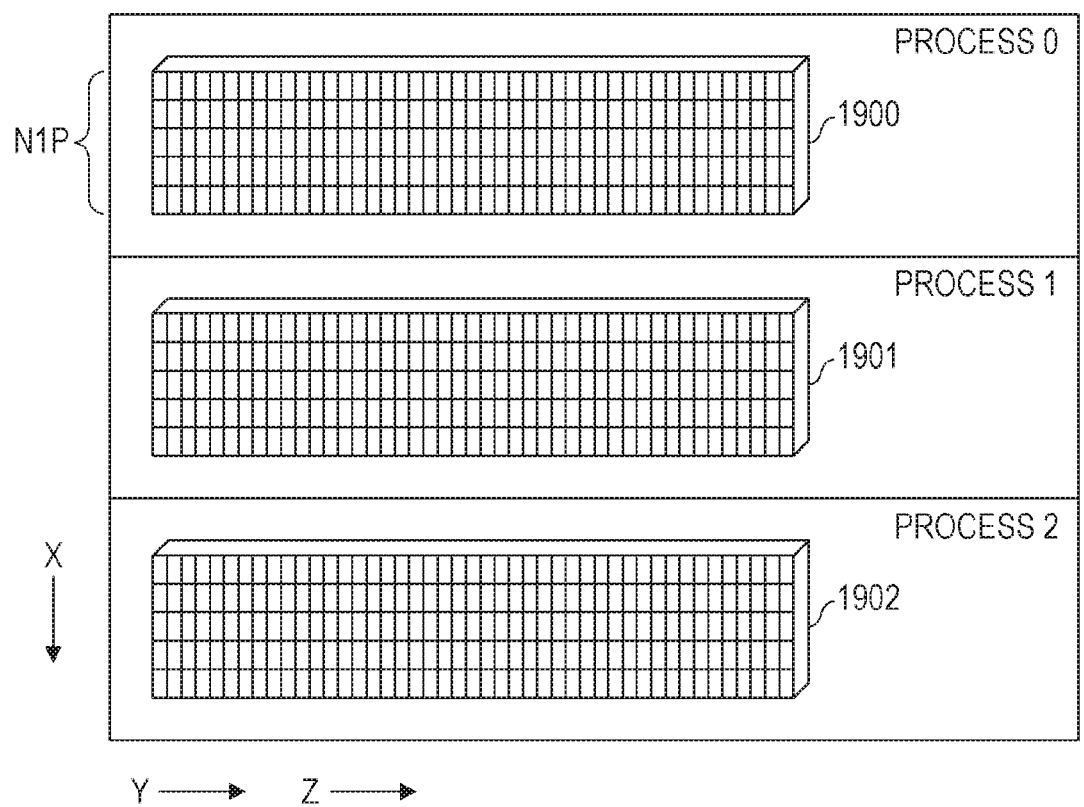
FIG. 19 is a diagram illustrating an example of the arrangement of elements.
Figure 20:
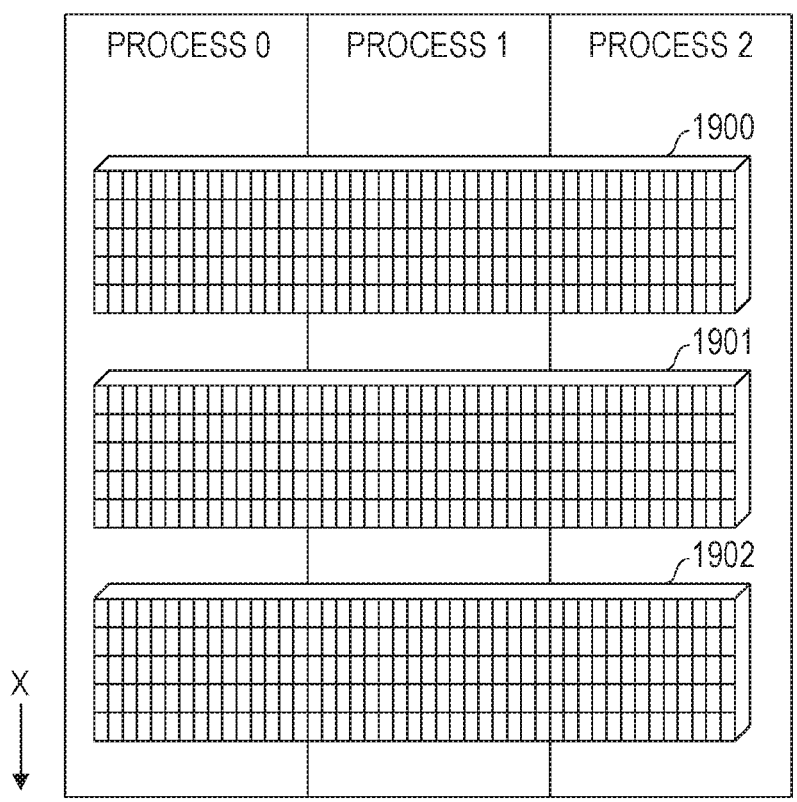
FIG. 20 is a diagram illustrating an example of the arrangement of elements.

The data communication in step S3 is, for example, all-to-all communication. FIG. 19 illustrates an example of element arrangement before data communication is performed. In FIG. 19, data 1900 is disposed in a process 0, data 1901 is disposed in a process 1, and data 1902 is disposed in a process 2. In the example of FIG. 19, X-direction data is distributed to the processes 0 to 2, and thus the processes 0 to 2 are not able to perform FFT in the X-direction in this state. Consequently, elements of arrays are exchanged with each other by the data communication in step S3 so that each process includes X-direction data. FIG. 20 illustrates an example of element arrangement after data communication is performed. In the example of FIG. 20, each process includes a portion of each of the pieces of the data 1901 to 1902, and X-direction data is disposed in each process.

Figure 18:
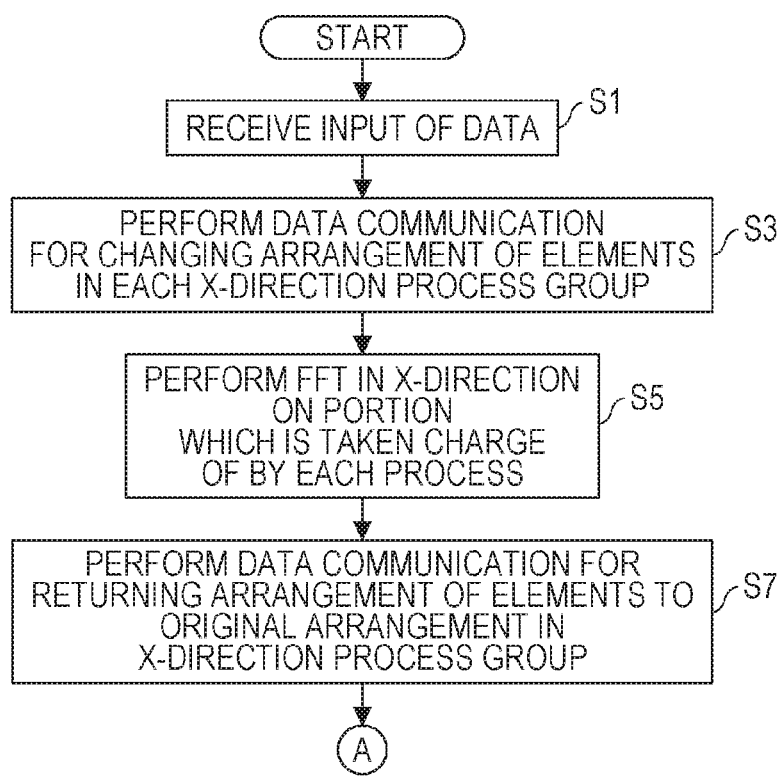
FIG. 18 is a diagram illustrating a processing flow of FFT of forward transformation.

Returning to a description of FIG. 18, each process performs FFT in the X-direction on elements included in the process (step S5).

However, in this state, it is not possible to perform FFT in the Y-direction and FFT in the Z-direction. Consequently, each process performs data communication for returning the arrangement of elements to the original arrangement between the process and a process belonging to the same X-direction process group (step S7). In addition, each process stores elements having been subjected to FFT in the X-direction in a storage area (here, an area of an output array) which is managed by the process. The processing proceeds to processing of step S9 in FIG. 21 through a terminal A.

The data communication in step S7 is, for example, all-to-all communication, and is communication in a direction opposite to the data communication in step S3. Elements are disposed again as illustrated in FIG. 19 by the data communication in step S7.

Figure 21:
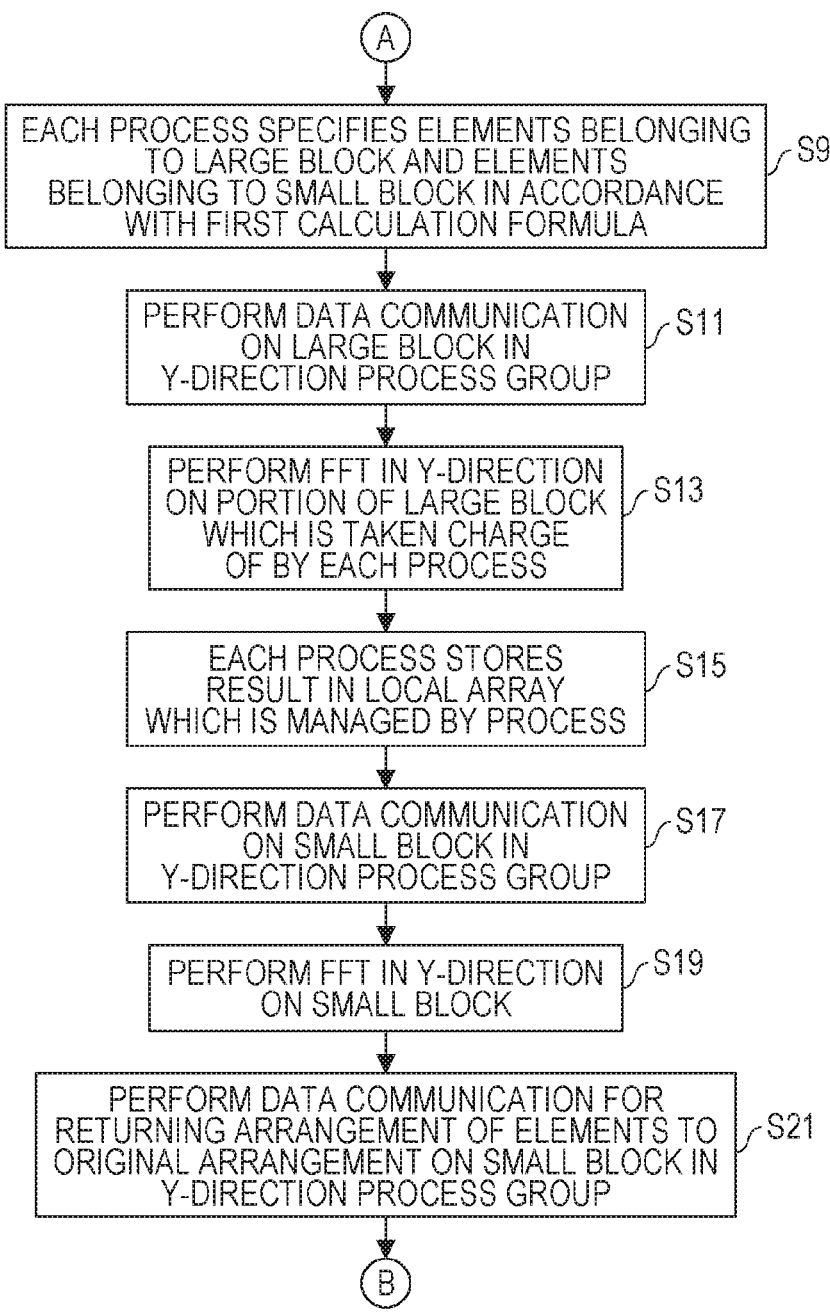
FIG. 21 is a diagram illustrating a processing flow of FFT of forward transformation.

In a description of FIG. 21, each process specifies elements belonging to a large block and elements belonging to a small block among elements included in the process in accordance with a first calculation formula (step S9). The wording "first calculation formula" as used herein refers to a calculation formula of, for example, N2P×N3P×N1P$_{block}$. Here, the relation of N1P$_{block}$=FLOOR(N1P/ND2) is established. FLOOR( ) is a function obtained by discarding a value after the decimal point. It is possible to calculate the number of elements belonging to a large block by the above-mentioned formulas. Among the elements included in the process, the elements of calculated number are specified as elements belonging to a large block. Elements other than the elements belonging to the large block are elements belonging to a small block. Meanwhile, a condition that the arrangement of elements in the Z-direction is not broken is reflected on the first calculation formula.

Each process performs data communication for changing the arrangement of elements belonging to a large block between the process and a process belonging to the same Y-direction process group (step S11). For example, in the example of FIG. 17, processes 0, 3, 6, and 9 belong to the same Y-direction process group, processes 1, 4, 7, and 10 belong to the same Y-direction process group, processes 2, 5, 8, and 11 belong to the same Y-direction process group, processes 12, 15, 18, and 21 belong to the same Y-direction process group, processes 13, 16, 19, and 22 belong to the same Y-direction process group, processes 14, 17, 20, and 23 belong to the same Y-direction process group, processes 24, 27, 30, and 33 belong to the same Y-direction process group, processes 25, 28, 31, and 34 belong to the same Y-direction process group, processes 26, 29, 32, and 35 belong to the same Y-direction process group. The data communication in step S11 is, for example, all-to-all communication.

Each process performs FFT in the Y-direction on a portion of a large block which is included in and taken charge of by the process (step S13). In addition, each process stores elements having been subjected to the FFT in the Y-direction in a storage area (here, area of an output array) which is managed by the process (step S15).

Each process performs data communication for changing the arrangement of elements belonging to a small block between the process and a process belonging to the same Y-direction process group (step S17). The data communication in step S17 is, for example, alltoallv communication in an MPI or all-to-all communication.

Figure 22:
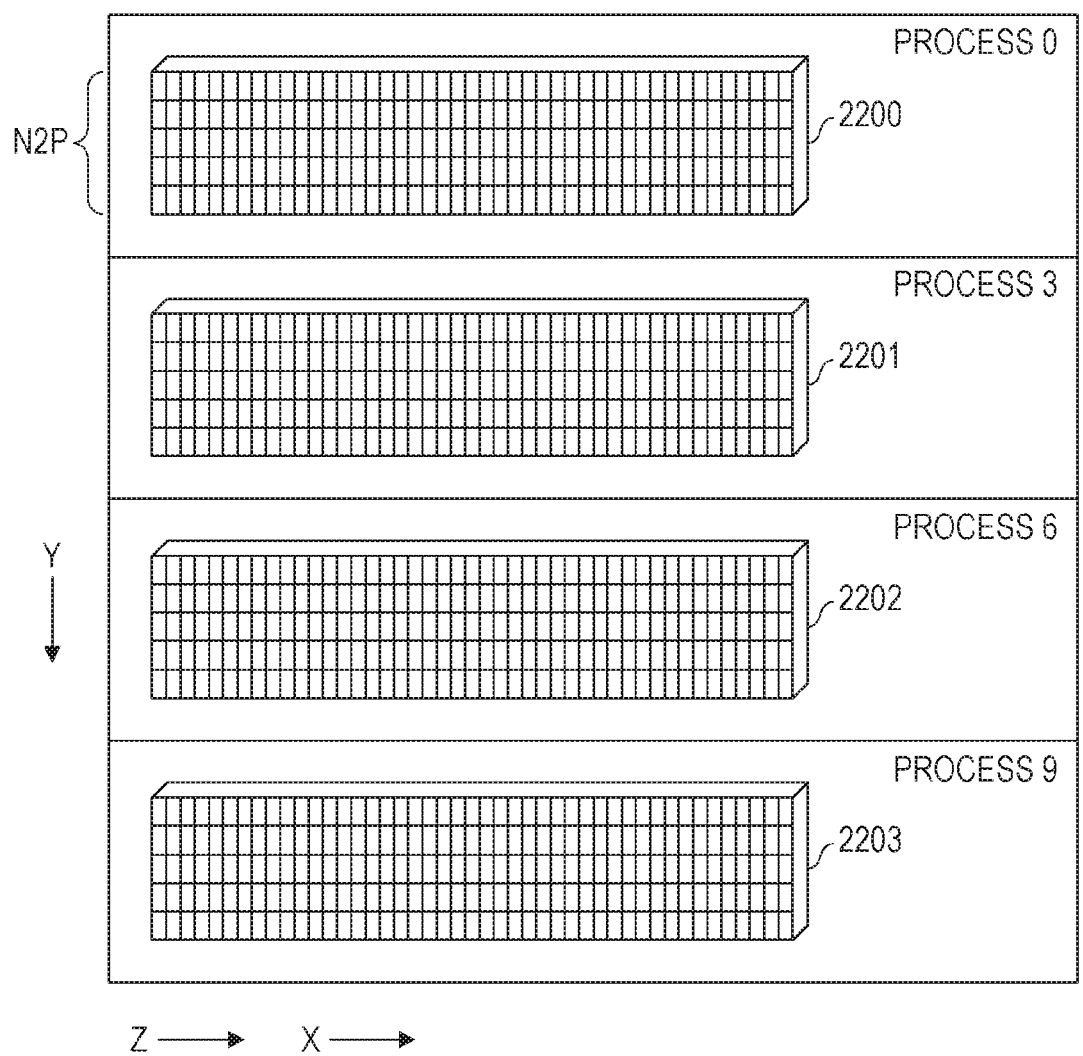
FIG. 22 is a diagram illustrating an example of the arrangement of elements.

FIG. 22 illustrates an example of data arrangement before the data communication in step S11 is performed. In FIG. 22, data 2200 is disposed in a process 0, data 2201 is disposed in a process 3, data 2202 is disposed in a process 6, and data 2203 is disposed in a process 9. In the example of FIG. 22, Y-direction data is distributed to four processes, and thus the processes 0, 3, 6, and 9 are not able to perform FFT in the Y-direction in this state. Consequently, elements of a large block are exchanged with each other by the data communication in step S11 so that each process includes Y-direction data. In addition, the arrangement of elements belonging to a small block is changed by the data communication in step S17, and the Y-direction data is collected in at least a portion of the four processes.

Figure 23:
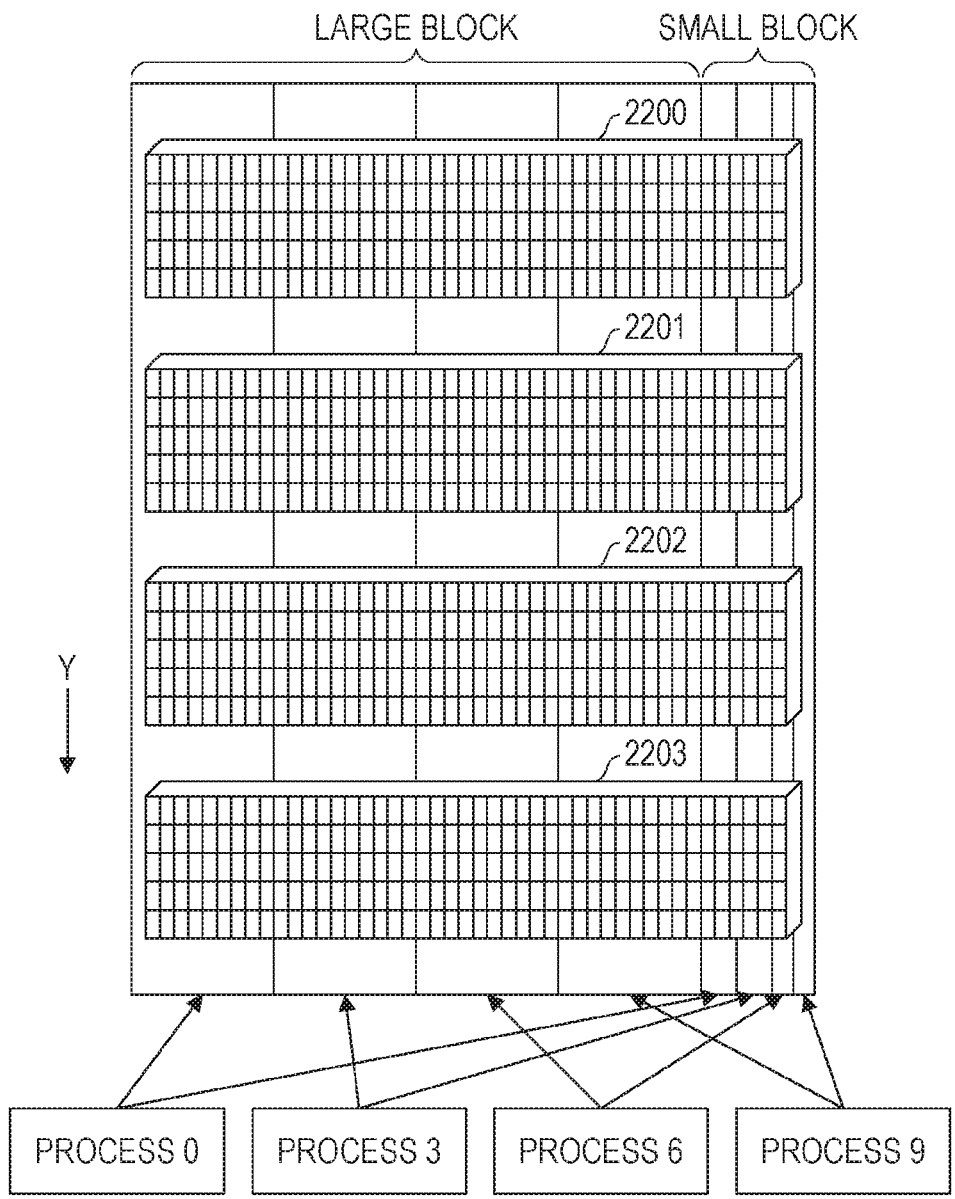
FIG. 23 is a diagram illustrating an example of the arrangement of elements.

FIG. 23 illustrates an example of data arrangement after data communication is performed. In the example of FIG. 23, each process includes Y-direction data of a large block and Y-direction data of a small block. In the example of FIG. 23, each process includes Y-direction data of a small block, but a portion of the process may include the Y-direction data. In addition, as illustrated in FIG. 23, the processes do not necessarily include the same number of elements.

Returning to a description of FIG. 21, a process including elements belonging to a small block performs FFT in the Y-direction on a portion of the small block which is included in and taken charge of by the process (step S19).

Figure 24:
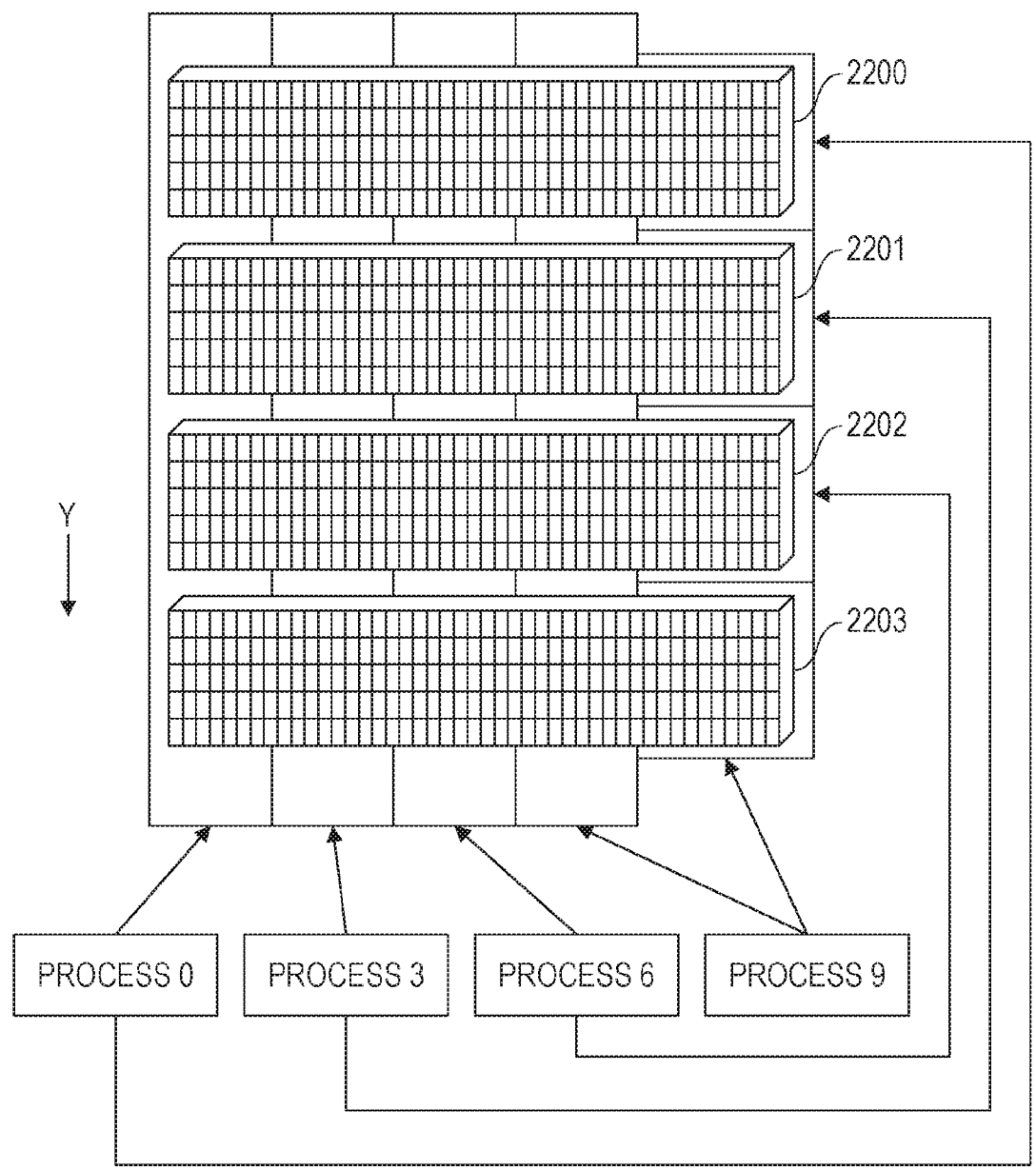
FIG. 24 is a diagram illustrating an example of the arrangement of elements.

Each process performs data communication for returning the arrangement of elements belonging to a small block to the original arrangement between the process and a process belonging to the same Y-direction process group (step S21). In addition, each process stores elements having been subjected to FFT in the Y-direction in a storage area (here, an area of an output array) which is managed by the process. The processing proceeds to processing of step S23 in FIG. 25 through a terminal B. Meanwhile, the data communication in step S21 is, for example, alltoallv communication in an MPI or all-to-all communication, and is communication in a direction opposite to the data communication in step S17. Elements are disposed by the data communication in step S21 as illustrated in FIG. 24. In the example of FIG. 24, the numbers of elements included in respective processes are the same as each other.

Figure 25:
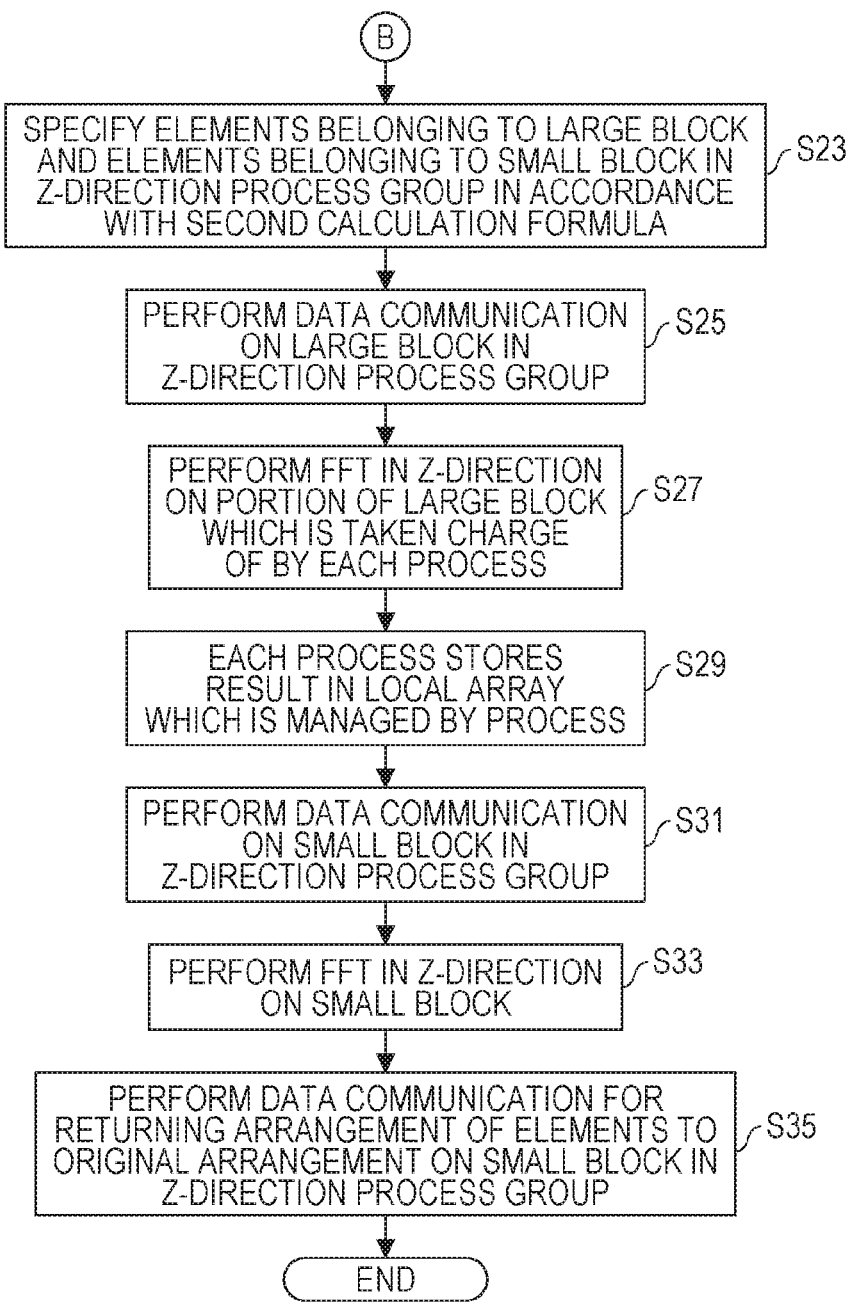
FIG. 25 is a diagram illustrating a processing flow of FFT of forward transformation.

In a description of FIG. 25, each process specifies elements belonging to a large block and elements belonging to a small block among elements included in the process in accordance with a second calculation formula (step S23). The wording "second calculation formula" as used herein refers to a calculation formula of, for example, N3P×M$_{block}$. Here, the relation of M$_{block}$=FLOOR((N1P/N2P)/ND3) is established. It is possible to calculate the number of elements belonging to a large block by the above-mentioned formulas. Among the elements included in the process, the elements of the calculated number are specified as elements belonging to a large block. Elements other than the elements belonging to the large block are elements belonging to a small block.

Each process performs data communication for changing the arrangement of elements belonging to a large block between the process and a process belonging to the same Z-direction process group (step S25). For example, in the example of FIG. 17, processes 0, 12, and 24 belong to the same Z-direction process group, processes 1, 13, and 25 belong to the same Z-direction process group, processes 2, 14, and 26 belong to the same Z-direction process group, processes 3, 15, and 27 belong to the same Z-direction process group, processes 4, 16, and 28 belong to the same Z-direction process group, processes 5, 17, and 29 belong to the same Z-direction process group, processes 6, 18, and 30 belong to the same Z-direction process group, processes 7, 19, and 31 belong to the same Z-direction process group, processes 8, 20, and 32 belong to the same Z-direction process group, processes 9, 21, and 33 belong to the same Z-direction process group, processes 10, 22, and 34 belong to the same Z-direction process group, and processes 11, 23, and 35 belong to the same Z-direction process group. The data communication in step S25 is, for example, all-to-all communication.

Each process performs FFT in the Z-direction on a portion of a large block which is included in and taken charge of by the process (step S27). In addition, each process stores elements having been subjected to the FFT in the Z-direction in a storage area (here, an area of an output array) which is managed by the process (step S29).

Each process performs data communication for changing the arrangement of elements belonging to a small block between the process and a process belonging to the same Z-direction process group (step S31). The data communication in step S31 is, for example, alltoallv communication in an MPI or all-to-all communication.

Figure 26:
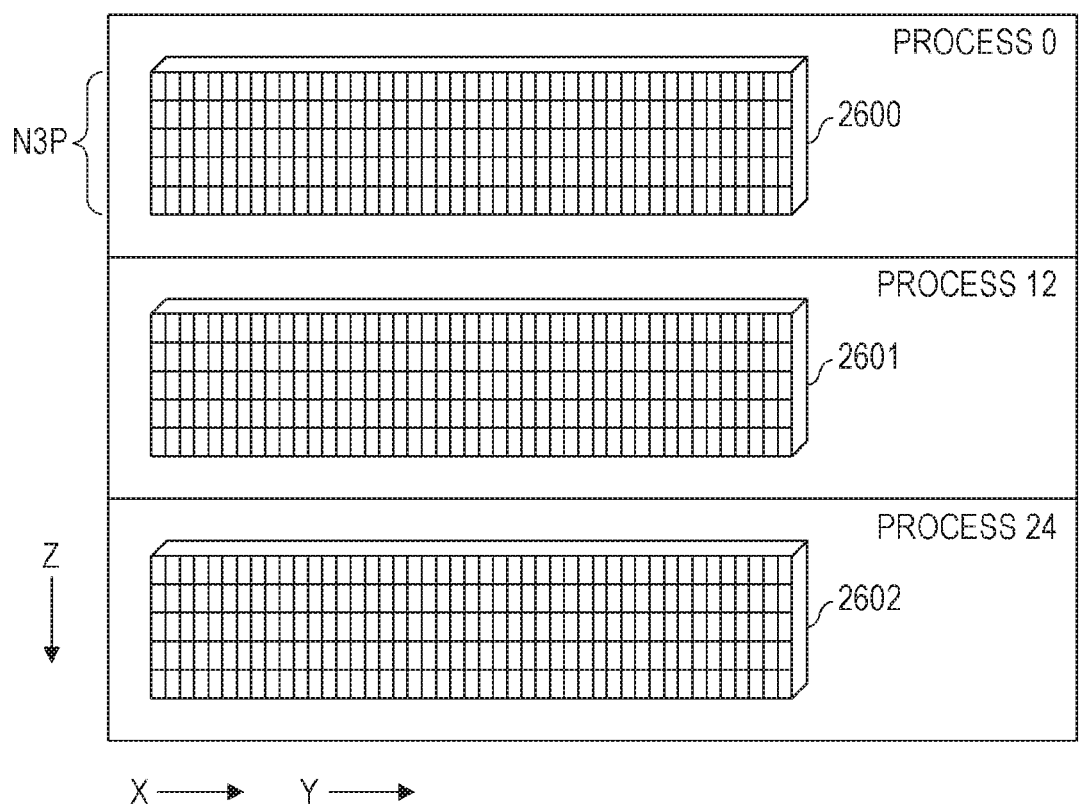
FIG. 26 is a diagram illustrating an example of the arrangement of elements.

FIG. 26 illustrates an example of data arrangement before the data communication in step S25 is performed. In FIG. 26, data 2600 is disposed in a process 0, data 2601 is disposed in a process 12, and data 2602 is disposed in a process 24. In the example of FIG. 26, Z-direction data is distributed to three processes, and thus the processes 0, 12, and 24 are not able to perform FFT in the Z-direction. Consequently, elements of a large block are exchanged with each other by the data communication in step S25 so that each process includes Z-direction data. In addition, the arrangement of elements belonging to a small block is changed by the data communication in step S31, and the Z-direction data is collected in at least a portion of the three processes.

Figure 27:
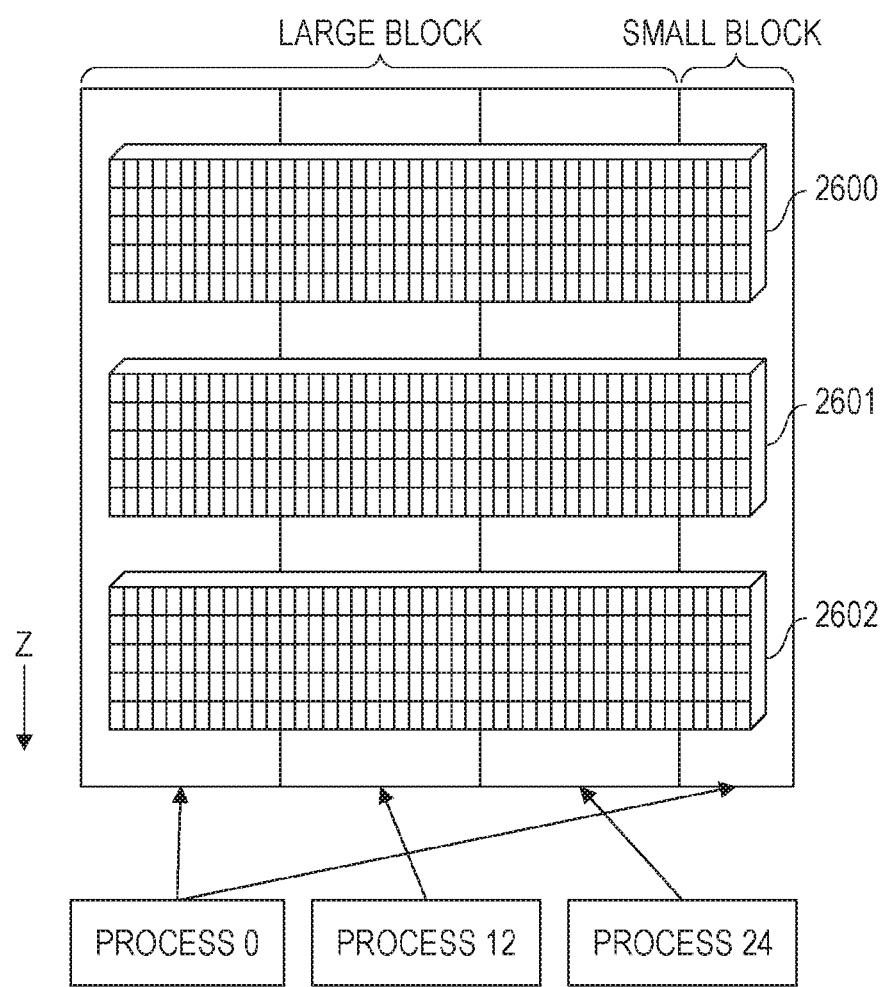
FIG. 27 is a diagram illustrating an example of the arrangement of elements.

FIG. 27 illustrates an example of data arrangement after data communication is performed. In the example of FIG. 27, a process 0 includes Z-direction data of a large block and Z-direction data of a small block, and processes 12 and 24 include Z-direction data of a large block. In the example of FIG. 27, the process 0 includes Z-direction data of a small block, but any of other processes may include Z-direction data of a small block. In addition, as illustrated in FIG. 27, the processes do not necessarily include the same number of elements.

Returning to a description of FIG. 25, a process including elements belonging to a small block performs FFT in the Z-direction on a portion of the small block which is included in and taken charge of by the process (step S33).

Figure 28:
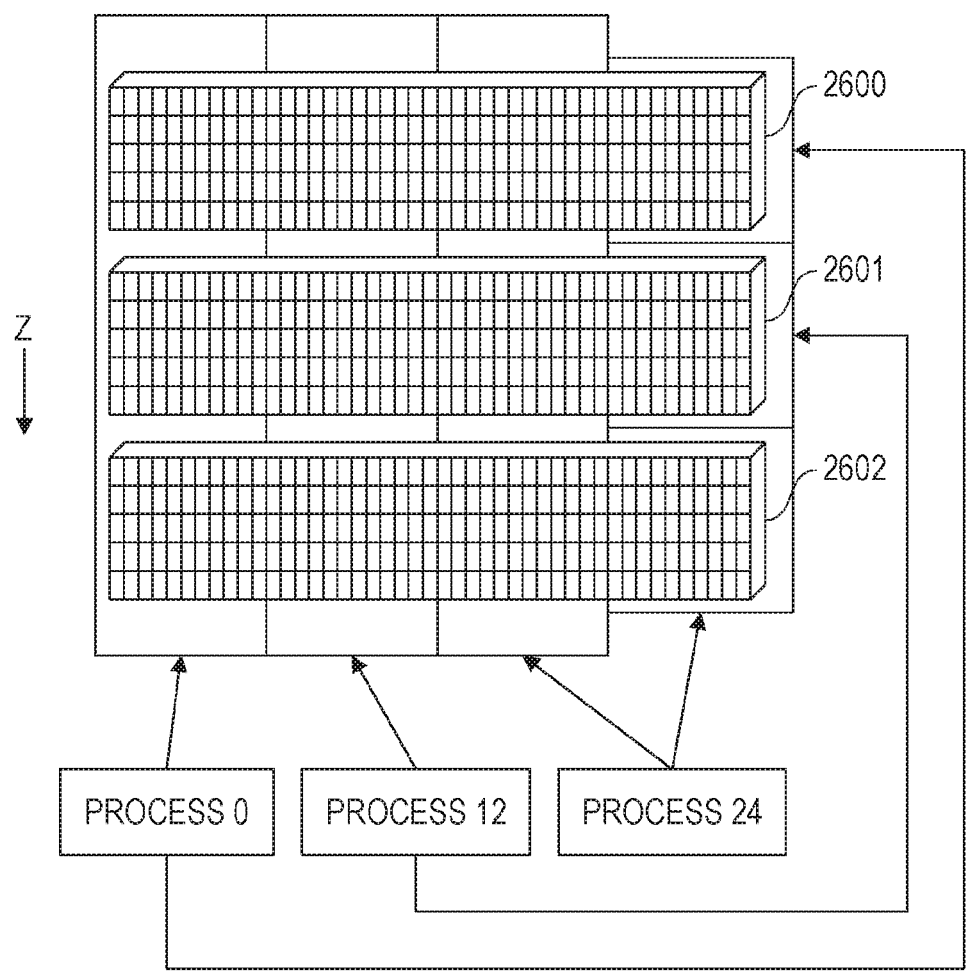
FIG. 28 is a diagram illustrating an example of the arrangement of elements.
Figure 29:
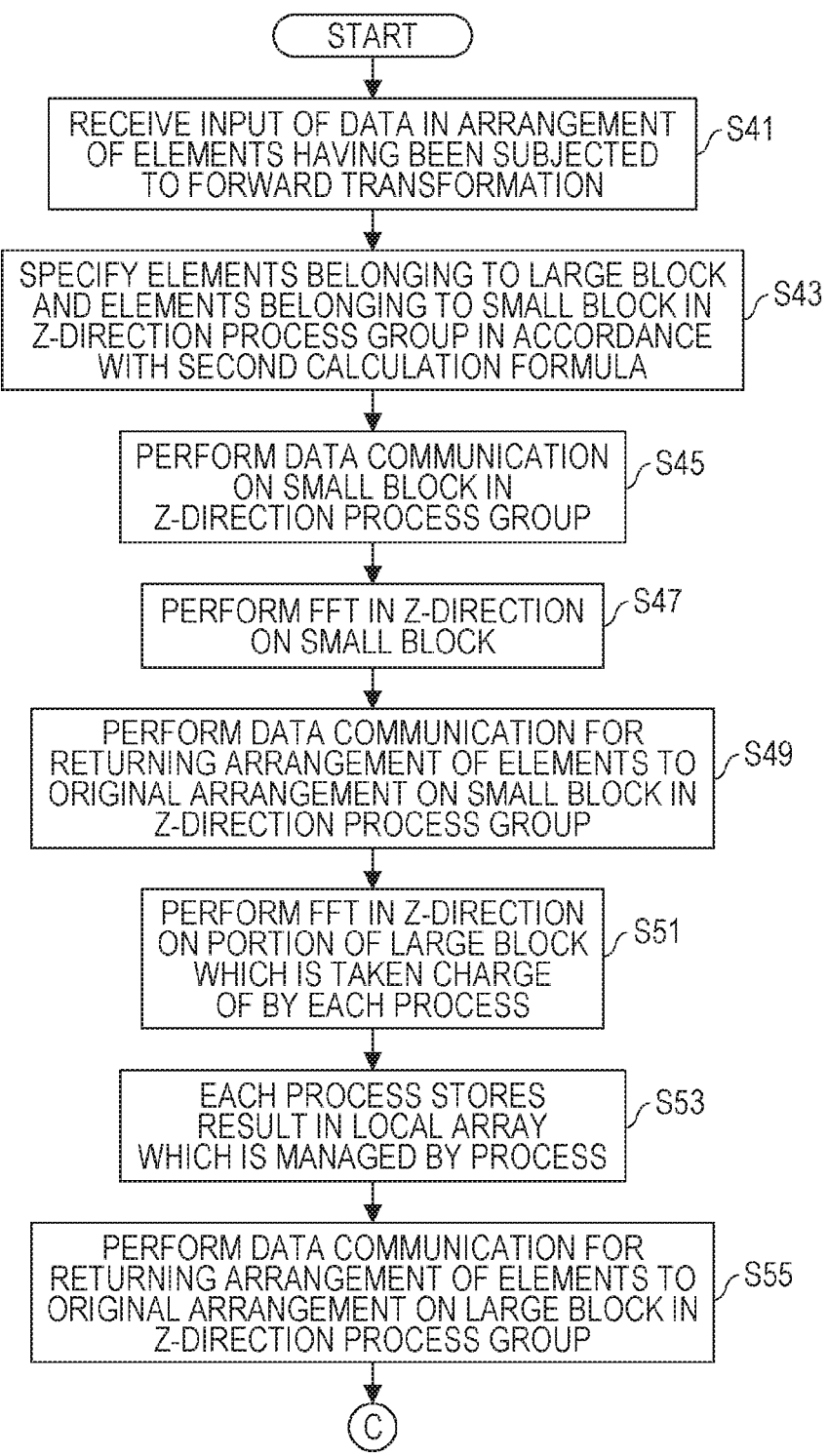
FIG. 29 is a diagram illustrating a processing flow of FFT of inverse transformation.

Each process performs data communication for returning the arrangement of elements belonging to a small block to the original arrangement between the process and a process belonging to the same Z-direction process group (step S35). In addition, each process stores elements having been subjected to FFT in the Z-direction in a storage area (here, an area of an output array) which is managed by the process. Then, the processing is terminated. Meanwhile, the data communication in step S35 is, for example, alltoallv communication in an MPI or all-to-all communication, and is communication in a direction opposite to the data communication in step S31. Elements are disposed by the data communication in step S31 as illustrated in FIG. 28. In the example of FIG. 28, the numbers of elements included in respective processes are the same as each other.

Next, FFT of inverse transformation is described. The FFT of inverse transformation is basically processing which is opposite to FFT of forward transformation.

Each of processes operated in the parallel computer system receives an input of data (that is, elements of a local array) in the arrangement of elements having been subjected to forward transformation (FIG. 29: step S41), and stores the received data in a storage area (here, a portion of an area in a shared memory) which is managed by the process.

Each process specifies elements belonging to a large block and elements belonging to a small block among elements included in the process in accordance with the second calculation formula (step S43).

Each process performs data communication for changing the arrangement of elements belonging to a small block between the process and a process belonging to the same Z-direction process group (step S45). The data communication in step S45 is, for example, alltoallv communication in an MPI or all-to-all communication.

A process including elements belonging to a small block performs FFT in the Z-direction on a portion of the small block which is included in and taken charge of by the process (step S47).

Each process performs data communication for returning the arrangement of elements belonging to a small block to the original arrangement between the process and a process belonging to the same Z-direction process group (step S49). In addition, each process stores elements having been subjected to FFT in the Z-direction in a storage area (here, an area of an output array) which is managed by the process. Meanwhile, the data communication in step S49 is, for example, alltoallv communication in an MPI or all-to-all communication, and is communication in a direction opposite to the data communication in step S45.

Each process performs FFT in the Z-direction on a portion of a large block which is included in and taken charge of by the process (step S51). In addition, each process stores elements having been subjected to the FFT in the Z-direction in a storage area (here, an area of an output array) which is managed by the process (step S53).

Each process performs data communication for returning the arrangement of elements belonging to a large block to the original arrangement between the process and a process belonging to the same Z-direction process group (step S55). The data communication in step S55 is, for example, all-to-all communication. The processing proceeds to step S57 in FIG. 30 through a terminal C.

Figure 30:
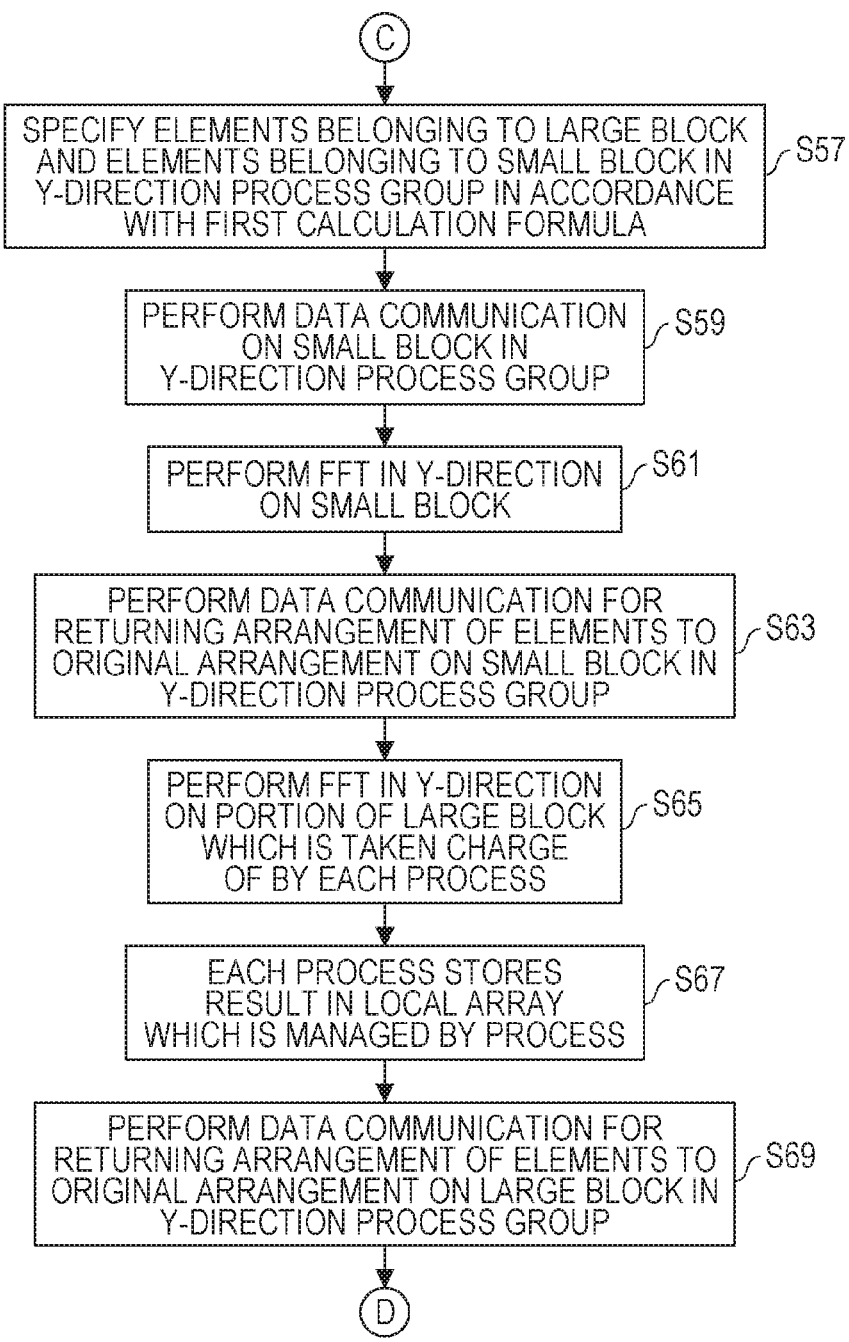
FIG. 30 is a diagram illustrating a processing flow of FFT of inverse transformation.

In a description of FIG. 30, each process specifies elements belonging to a large block and elements belonging to a small block among elements included in the process in accordance with the first calculation formula (step S57).

Each process performs data communication for changing the arrangement of elements belonging to a small block between the process and a process belonging to the same Y-direction process group (step S59). The data communication in step S59 is, for example, alltoallv communication in an MPI or all-to-all communication.

A process including elements belonging to a small block performs FFT in the Y-direction on a portion of the small block which is included in and taken charge of by the process (step S61).

Each process performs data communication for returning the arrangement of elements belonging to a small block to the original arrangement between the process and a process belonging to the same Y-direction process group (step S63). In addition, each process stores elements having been subjected to FFT in the Y-direction in a storage area (here, an area of an output array) which is managed by the process. Meanwhile, the data communication in step S63 is, for example, alltoallv communication in an MPI or all-to-all communication, and is communication in a direction opposite to the data communication in step S59.

Each process performs FFT in the Y-direction on a portion of a large block which is included in and taken charge of by the process (step S65). In addition, each process stores elements having been subjected to the FFT in the Y-direction in a storage area (here, an area of an output array) which is managed by the process (step S67).

Each process performs data communication for returning the arrangement of elements belonging to a large block to the original arrangement between the process and a process belonging to the same Y-direction process group (step S69). The data communication in step S69 is, for example, all-to-all communication. The processing proceeds to step S71 in FIG. 31 through a terminal D.

Figure 31:
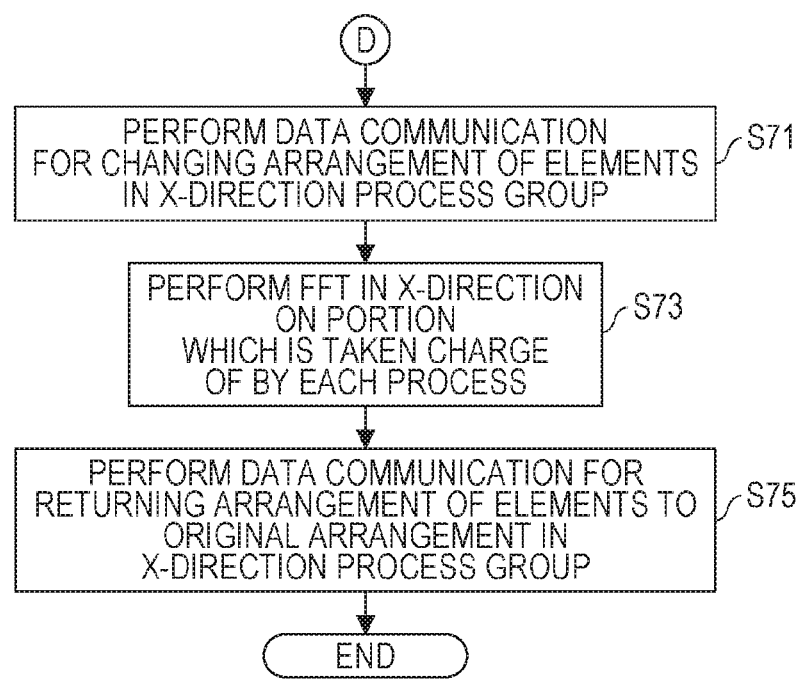
FIG. 31 is a diagram illustrating a processing flow of FFT of inverse transformation.

In a description of FIG. 31, each process performs data communication for changing the arrangement of elements between the process and a process belonging to the same X-direction process group (step S71). The data communication in step S71 is, for example, all-to-all communication.

Each process performs FFT in the X-direction on elements included in the process (step S73).

Each process performs data communication for returning the arrangement of elements to the original arrangement between the process and a process belonging to the same X-direction process group (step S75). In addition, each process stores elements having been subjected to FFT in the X-direction in a storage area (here, an area of an output array) which is managed by the process. Then, the processing is terminated. Meanwhile, the data communication in step S75 is, for example, all-to-all communication, and is communication in a direction opposite to the data communication in step S71.

Effects of the present embodiment are described with reference to FIG. 32. A case where a global array is simply divided by one-axis distribution or two-axis distribution is compared with a case where an FFT multiplicity is divided between processes. Items for the comparison include the amount of all-to-all communication, the strength of restriction, and the length of a message in a case where a total number of processes is NP. A portion corresponding to a method of the present embodiment is hatched. The term "NP" as used herein refers to the number of divisions of processing of a large block which is described with reference to FIG. 15.

As illustrated in FIG. 32, according to the present embodiment, it is possible to reduce the amount of all-to-all communication as compared to a method in which communication for returning the arrangement of elements to the original arrangement is performed as usual. In addition, it is possible to relax restrictions on the division of a global array. Furthermore, when processing of a large block is divided, performance may be improved by the blocking of the processing. In addition, overlapping of communication and an arithmetic operation, which has been difficult in a batch communication method, may be performed.

As described above, in the present embodiment, elements are disposed so that the number of elements of an output array does not become non-uniform between processes, and a communication method for that is devised. Thereby, it is possible to improve versatility by relaxing restrictions on the number of elements and the number of division in each axial direction, and to perform calculation with high performance by suppressing the amount of communication.

While the embodiment has been described so far, but is not limited thereto. For example, in a processing flow, it is also possible to change the order of processing operations insofar as a processing result does not change. Furthermore, the processing operations may be performed in parallel.

In addition, the division mode mentioned above is just an example. For example, the arrangement of elements belonging to a small block is not limited to the above-mentioned example.

The above-described embodiment is summarized as follows.

A parallel computer system according to a first aspect of the present embodiment includes (A) a plurality of processing apparatuses that perform an arithmetic operation on elements of an array in parallel. Each of the plurality of processing apparatuses (a1) performs an arithmetic operation in a first axial direction on a first predetermined number of elements among elements disposed in the processing apparatus, and (a2) stores the first predetermined number of elements having been subjected to the arithmetic operation in a storage device of the processing apparatus. At least some of the plurality of processing apparatuses (a3) acquires elements other than the first predetermined number of elements from each of the plurality of processing apparatuses, (a4) performs an arithmetic operation in the first axial direction on the acquired elements, and (a5) performs a process of disposing a second predetermined number of elements having been subjected to the arithmetic operation in each of the plurality of processing apparatuses.

In this manner, it is possible to store the same number of elements in each of the processing apparatuses, and communication may not be performed on first elements. Therefore, it is possible to achieve both the relaxation of restrictions on the division of an array and an improvement in the performance of the parallel computer system.

In addition, each of the plurality of processing apparatuses (a6) may further perform a process of acquiring first elements by all-to-all communication between the plurality of processing apparatuses. In this manner, it is possible to arrange the first elements to be subjected to an arithmetic operation in the first axial direction.

In addition, each of the plurality of processing apparatuses may further perform a process of (a7) calculating a quotient by dividing the number of elements in a second axial direction by the number of plurality of processing apparatuses and (a8) calculating a first predetermined number by multiplying the number of elements in the first axial direction by the number of elements in a third axial direction and the calculated quotient. In this manner, the first predetermined number may be set to be as large as possible, and thus the effect of reducing the amount of communication is improved.

In addition, each of the plurality of processing apparatuses may further perform a process of (a9) calculating a quotient by dividing a number, calculated by multiplying the number of elements in the second axial direction by the number of elements in the third axial direction, by the number of plurality of processing apparatuses and (a10) calculating a first predetermined number by multiplying the number of elements in the first axial direction by the calculated quotient. In this manner, the first predetermined number may be set to be as large as possible, and thus the effect of reducing the amount of communication is improved.

In addition, the first predetermined number may be larger than the second predetermined number. In this manner, the amount of communication is further reduced, and thus it is possible to suppress the deterioration of performance due to an increase in the amount of communication.

In addition, an arithmetic operation may be three-dimensional fast Fourier transform.

In addition, an array may be a three-dimensional array.

An arithmetic method according to a second aspect of the present embodiment is executed by a computer. The arithmetic method includes (B) performing an arithmetic operation in a first axial direction on a first predetermined number of elements among elements disposed in the computer, (C) storing the first predetermined number of elements having been subjected to the arithmetic operation in a storage device of the computer, (D) performing an arithmetic operation in the first axial direction on elements to be acquired from other plurality of computers, other than the first predetermined number of elements in the plurality of computers, and (E) disposing a second predetermined number of elements having been subjected to the arithmetic operation in the computer and each of the other plurality of computers.

Meanwhile, it is possible to create a program for causing a processor to perform processing according to the above-mentioned method, and the program is stored in a computer-readable storage medium or storage device such as a flexible disk, a CD-ROM, a magneto-optical disk, a semiconductor memory, or a hard disk. In addition, an intermediate processing result is temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A parallel computer system comprising:
    a plurality of processing nodes that perform an arithmetic operation on elements of a data array in parallel, each of the processing nodes including
        a memory storing at least one value of an element of a data array,
        a processor coupled to the memory; and
        a communication network connecting the processing nodes,
    wherein the processing nodes execute processes in parallel to perform arithmetic operations on elements of a data array of more than two dimensions with a first number of elements in a first axial direction of the data array not evenly divisible by a second number of the processes in the first axial direction executed by the processing nodes, where the processors
        specify large blocks of the elements of the data array in the first axial direction, based on the first number of the elements and the second number of the processes in the first axial direction, each of the large blocks containing a third number of the elements, thereby yielding uniform local arrays for each of the processes in the first axial direction with remaining elements in the data array not included in the lame blocks,
        specify small blocks of the remaining elements from a remainder of the data array in the first axial direction, each of the small blocks having a fourth number of elements smaller than the third number of elements in the large blocks,
        acquire the large blocks of the elements of the data array by the processing nodes executing the second number of the processes in the first axial direction,
        perform the arithmetic operation on the large blocks of the elements of the data array by the second number of the processes in the first axial direction, respectively,
        store results of the arithmetic operation on the large blocks of the elements of the data array in the memory of the processing nodes,
        acquire the small blocks of the elements of the data array in the first axial direction by at least some of the processing executing at least some of the second number of the processes,
        perform the arithmetic operation on the small blocks of the elements of the data array in the first axial direction by at least some of the processing nodes executing at least some of the second number of the processes, respectively,
        store results of the arithmetic operation on the small blocks of the elements of the data array in the memory of the processing nodes, and
        return the results of the arithmetic operation on the small blocks of the elements of the data array to first locations from which the small blocks were acquired.

2. The parallel computer system according to claim 1, wherein the processor in each of the processing nodes further acquires the elements by all-to-all communication between the processing nodes.

3. The parallel computer system according to claim 1, wherein the processor in each of the processing nodes further
    calculates a quotient by dividing a fifth number of the elements in a second axial direction by a sixth number of the processing nodes, and
    calculates a seventh number of the elements to undergo the arithmetic operation by multiplying the first number of the elements in the first axial direction by an eighth number of the elements in a third axial direction and the quotient.

4. The parallel computer system according to claim 1, wherein the processor in each of the processing nodes further
    calculates a quotient by dividing a fifth number, calculated by multiplying a sixth number of the elements in the second axial direction by a seventh number of the elements in a third axial direction, by an eighth number of the processing notes, and
    calculates a ninth number of the elements to undergo the arithmetic operation by multiplying the first number of elements in the first axial direction by the quotient.

5. The parallel computer system according to claim 1, wherein a fifth number of the elements that undergo the arithmetic operation is larger than a sixth number of the elements returned to the first locations.

6. The parallel computer system according to claim 1, wherein the arithmetic operation is three-dimensional fast Fourier transform.

7. The parallel computer system according to claim 1, wherein the data array is a three-dimensional array.

8. The parallel computer system according to claim 1, wherein the acquiring of the large blocks of the elements of the data array by the processing nodes is accomplished by all-to-all communication between the processing nodes via the communication network.

9. The parallel computer system according to claim 1, wherein, prior to the acquiring of the large blocks of the elements of the data array by the processing nodes executing the second number of the processes in the first axial direction, the processing nodes execute a fifth number of the processes in parallel to perform the arithmetic operations on the elements of the data array in a second axial direction, perpendicular to the first axial direction, where the first number is evenly divisible by the fifth number, by
- specifying uniform blocks of the elements of the data array in the second axial direction, based on the first number of the elements and the fifth number of the processes in the second axial direction, each of the uniform blocks containing a sixth number of the elements;
- performing the arithmetic operation on the uniform blocks of the elements of the data array by the fifth number of the processes in the second axial direction, respectively;
- storing results of the arithmetic operation on the uniform blocks of the elements of the data array in the memory of the processing nodes; and
- returning the results of the arithmetic operation on the uniform blocks of the elements of the data array to second locations from which the uniform blocks were acquired.

10. The parallel computer system according to claim 1, wherein the communication network is a six-dimensional mesh connecting the processing nodes which are six in number.

11. An arithmetic method performed in a parallel computer system including processing nodes that execute processes in parallel to perform an arithmetic operation on elements of a data array of more than two dimensions with a first number of elements in a first axial direction of the data array not evenly divisible by a second number of the processes in the first axial direction executed by the processing nodes, and a communication network connecting the processing nodes, each of the processing nodes having a memory and a processor coupled to the memory, the method comprising, in the processor in each of the processing nodes:
- specifying large blocks of the elements of the data array in the first axial direction, based on the first number of the elements and the second number of the processes in the first axial direction, each of the large blocks containing a third number of the elements, thereby yielding uniform local arrays for each of the processes in the first axial direction with remaining elements in the data array not included in the lame blocks;
- specifying small blocks of the remaining elements of the data array in the first axial direction, each of the small blocks having a fourth number of elements smaller than the third number of the elements in the large blocks;
- acquiring the large blocks of the elements of the data array by the processing nodes;
- performing the arithmetic operation on the large blocks of the elements of the data array by the second number of the processes in the first axial direction, respectively;
- storing results of the arithmetic operation on the large blocks of the elements of the data array in the memory of the processing nodes; and
- returning the results of the arithmetic operation on the small blocks of the elements of the data array to first locations from which the small blocks were acquired.

12. A non-transitory computer-readable storage medium that stores a program causing processing nodes of a parallel computer system, each having a processor coupled to a memory, that execute processes in parallel to perform an arithmetic operation on elements of a data array of more than two dimensions with a first number of elements in a first axial direction of the data array not evenly divisible by a second number of the processes in the first axial direction executed by the processing nodes, and a communication network connecting the processing nodes, the program causing the processing nodes to:
- specify large blocks of the elements of the data array in the first axial direction, based on the first number of elements of the data array and the second number of the processes in the first axial direction, each of the large blocks containing a third number of the elements, thereby yielding uniform local arrays for each of the processes in the first axial direction;
- specify small blocks of the remaining elements of the data array in the first axial direction, each of the small blocks having a fourth number of elements smaller than the third number of the elements in the large blocks;
- acquire the large blocks of the elements of the data array;
- perform the arithmetic operation on the lame blocks of the elements of the data array by the second number of the processes in the first axial direction, respectively;
- store results of the arithmetic operation on the large blocks of the elements of the data array in the memory of the processing nodes; and
- return the results of the arithmetic operation on the small blocks of the elements of the data array to first locations from which the small blocks were acquired.

* * * * *